(12) United States Patent
Sano et al.

(10) Patent No.: US 11,140,747 B2
(45) Date of Patent: Oct. 5, 2021

(54) BASE STATION AND USER APPARATUS

(71) Applicant: NTT DOCOMO, INC., Tokyo (JP)

(72) Inventors: Yousuke Sano, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 150 days.

(21) Appl. No.: 16/482,456

(22) PCT Filed: Feb. 1, 2018

(86) PCT No.: PCT/JP2018/003388
§ 371 (c)(1),
(2) Date: Jul. 31, 2019

(87) PCT Pub. No.: WO2018/143331
PCT Pub. Date: Aug. 9, 2018

(65) Prior Publication Data
US 2020/0045771 A1 Feb. 6, 2020

(30) Foreign Application Priority Data
Feb. 3, 2017 (JP) .............................. JP2017-019137

(51) Int. Cl.
*H04W 88/04* (2009.01)
*H04W 88/10* (2009.01)
*H04L 5/00* (2006.01)
*H04W 72/04* (2009.01)

(52) U.S. Cl.
CPC .......... *H04W 88/04* (2013.01); *H04L 5/0092* (2013.01); *H04W 72/042* (2013.01); *H04W 72/0446* (2013.01); *H04W 88/10* (2013.01)

(58) Field of Classification Search
CPC ... H04W 88/04; H04W 88/10; H04W 72/042; H04W 72/0446; H04L 5/0092
See application file for complete search history.

(56) References Cited

PUBLICATIONS

Yong Li et al., 'Control Channel Design for Carrier Aggregation between LTE FDD and LTE TDD Systems', IEEE, pp. 1-5. (Year: 2012).*
3GPP TS 36.211 V14.0.0; "3rd Generation Partnership Project; Technical Specification Group Radio Access Network; Evolved Universal Terrestrial Radio Access (E-UTRA); Physical channels and modulation (Release 14)"; Sep. 2016, (170 pages).
3GPP TS 36.213 V14.0.0; "3rd Generation Partnership Project; Technical Specification Group Radio Access Network; Evolved Universal Terrestrial Radio Access (E-UTRA); Physical layer procedures (Release 14)"; Sep. 2016, (406 pages).

(Continued)

*Primary Examiner* — Melvin C Marcelo
(74) *Attorney, Agent, or Firm* — Osha Bergman Watanabe & Burton LLP

(57) ABSTRACT

A base station configured to perform communication with a user apparatus in a radio communication system, including: a storage unit configured to store configuration information on an aggregated downlink control channel in which a plurality of downlink control channels in a plurality of slots are aggregated; and a transmission unit configured to transmit downlink control information, to the user apparatus, using the aggregated downlink control channel based on the configuration information.

9 Claims, 27 Drawing Sheets

(56) References Cited

PUBLICATIONS

LG Electronics; "PDCCH transmission for MTC coverage enhancement"; 3GPP TSG RAN WG1 Meeting #75, R1-135461; San Francisco, USA, Nov. 11-15, 2013 (5 pages).
ZTE; "Detailed design on M-PDCCH for MTC enhancement"; 3GPP TSG RAN WG1 Meeting #81, R1-152956; Fukuoka, Japan, May 25-29, 2015 (7 pages).
MediaTek Inc.; "On 2-stage Downlink Control Information for NR"; 3GPP TSG RAN WG1 Meeting #87, R1-1612121; Reno, USA, Nov. 14-18, 2016 (6 pages).
International Search Report issued in International Application No. PCT/JP2018/003388, dated Apr. 10, 2018 (5 pages).
Written Opinion issued in International Application No. PCT/JP2018/003388; dated Apr. 10, 2018 (5 pages).

\* cited by examiner

- TDD (called dynamic TDD)

- FDD

- Combination of TDD/FDD

EXAMPLE OF Static TDD

USE DL/UL PATTERN COMMON TO ALL CELLS
(DL/UL IS PREDETERMINED)

EXAMPLE OF Dynamic TDD

APPLY DL/UL PATTERN SPECIFIC TO EACH CELL
(DL/UL IS VARIABLE DEPENDING ON REQUIRED TRAFFIC AT THE TIME)

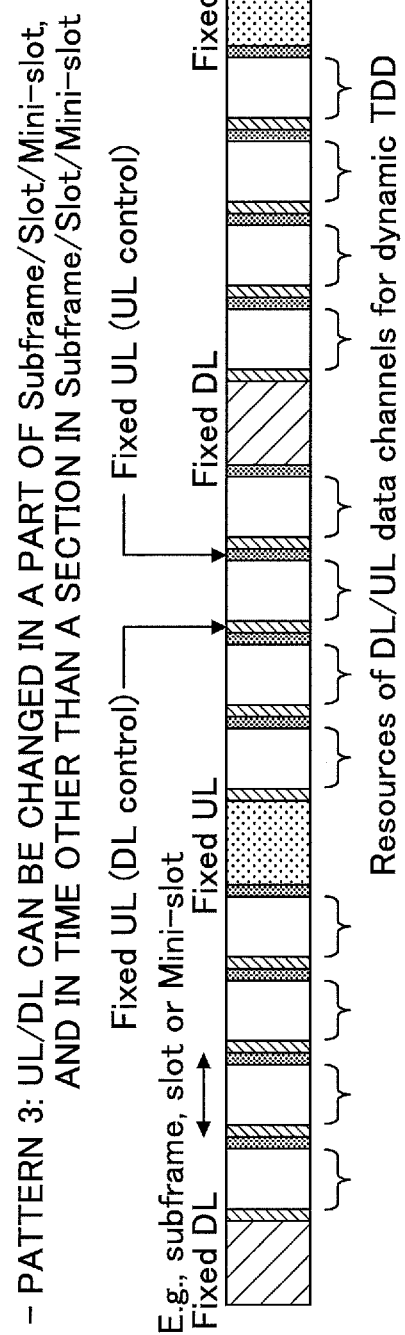

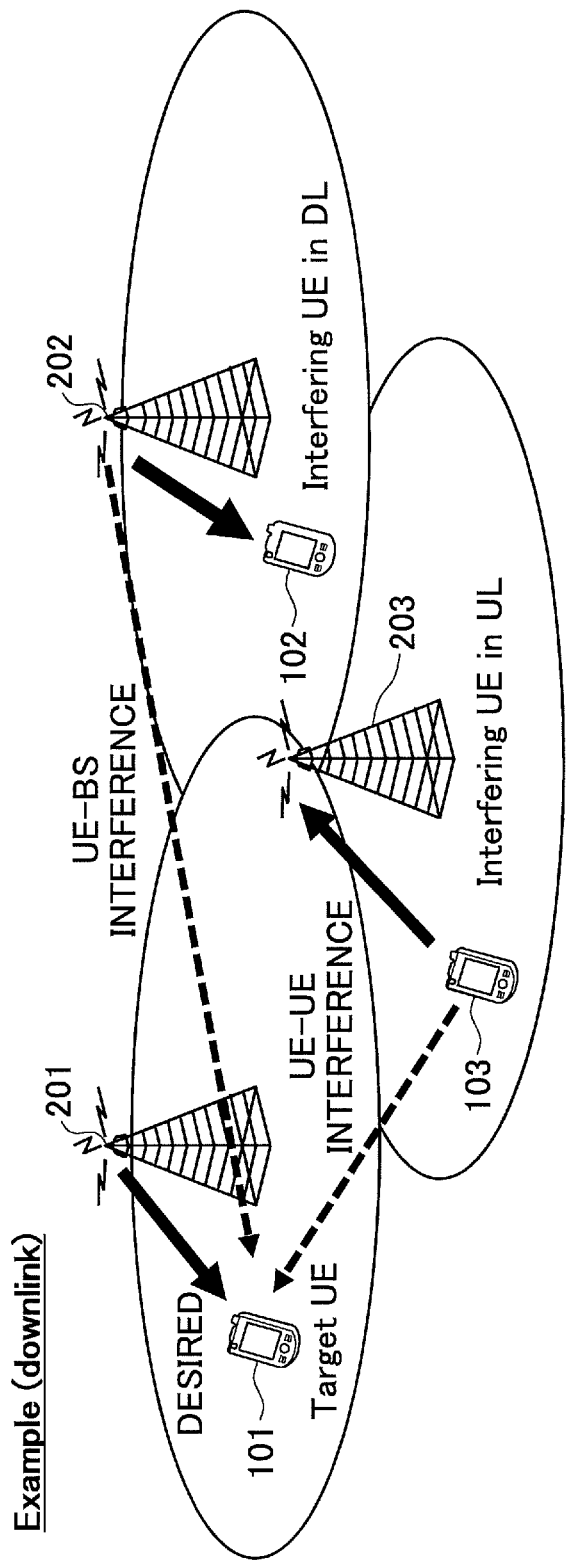

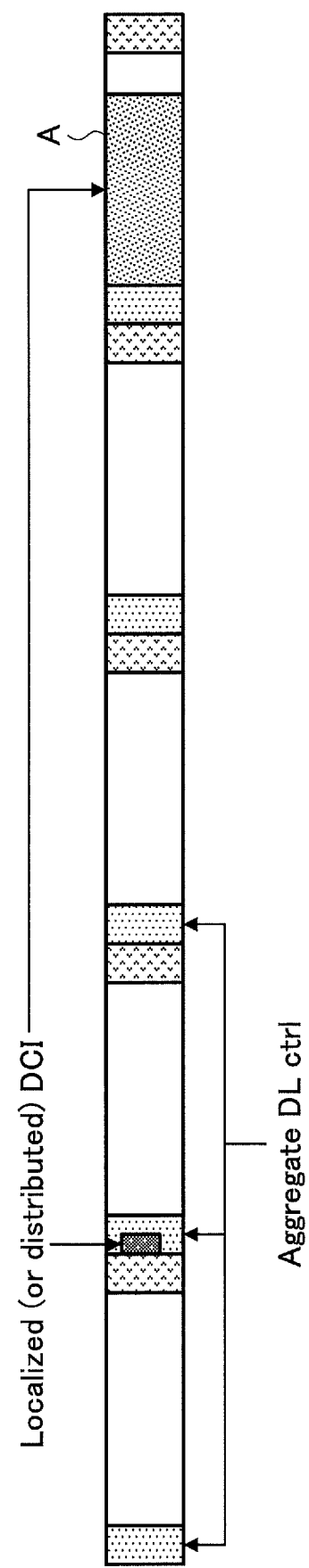

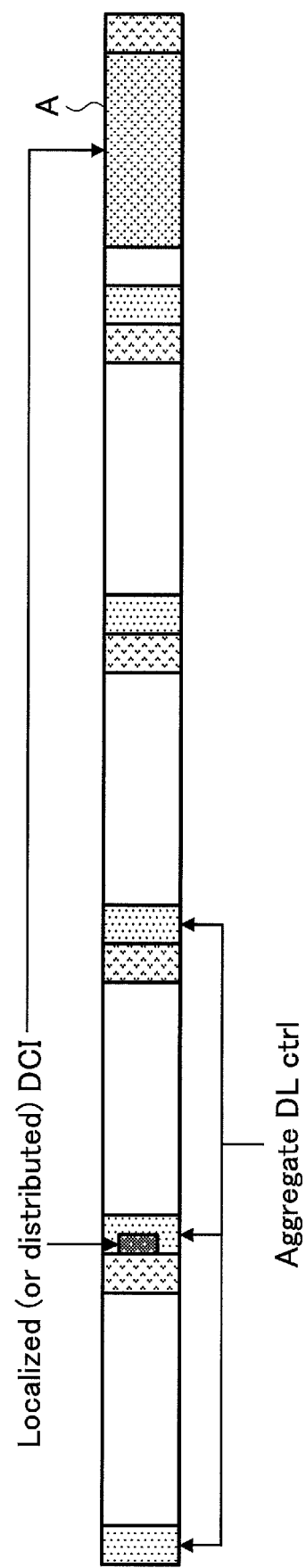

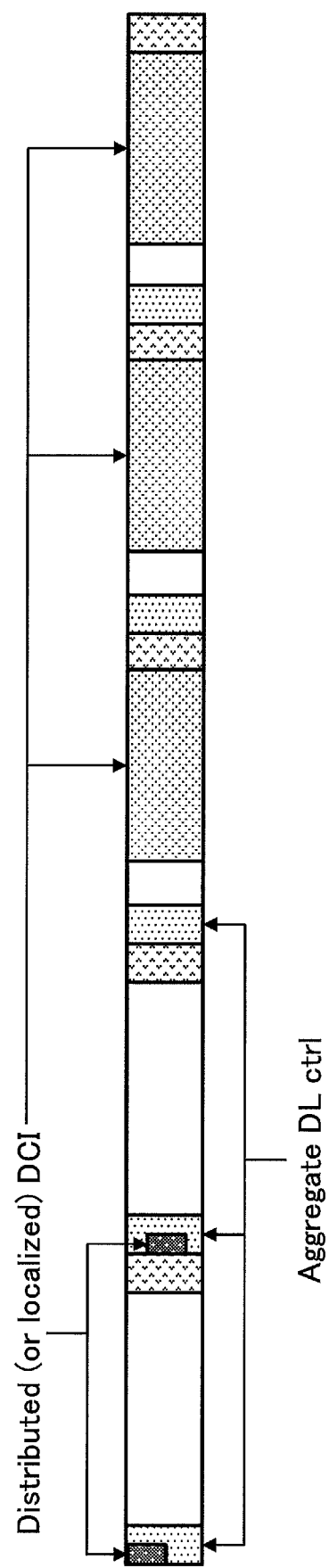

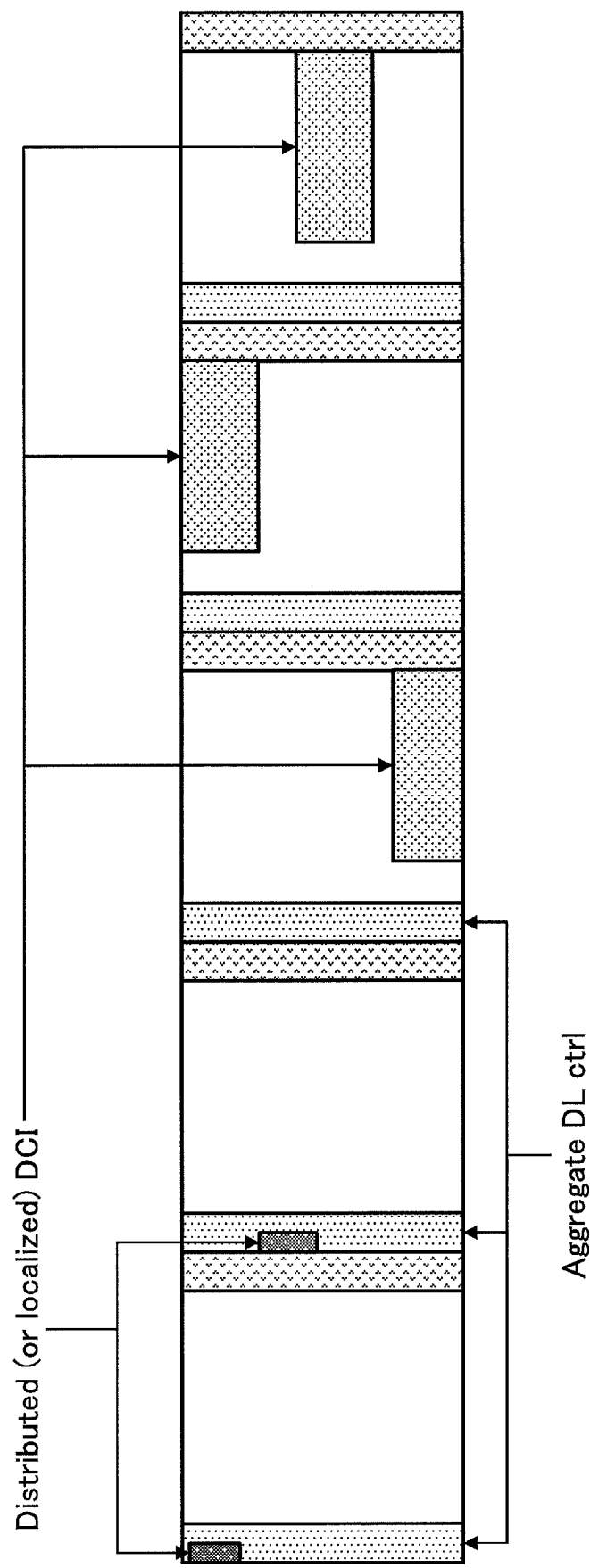

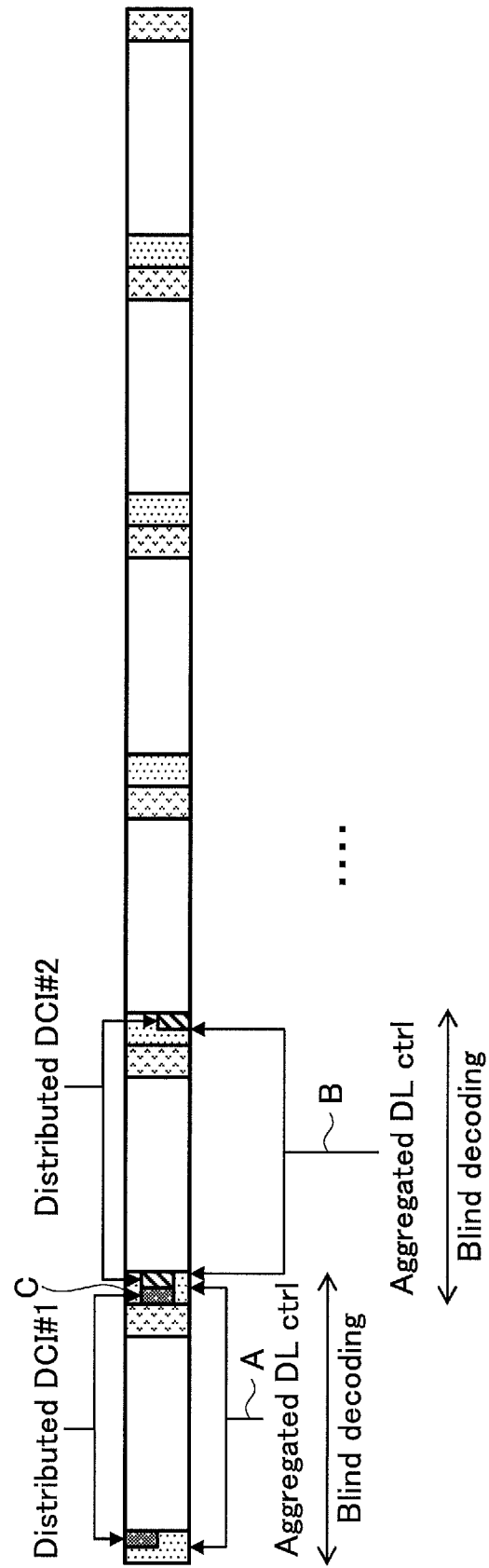

Aggregated DL ctrl

Aggregate DL ctrl

BASE STATION AND USER APPARATUS

TECHNICAL FIELD

The present invention relates to a user apparatus and a base station in a radio communication system.

BACKGROUND ART

In 3GPP (Third Generation Partnership Project), the next generation communication standards (5G or NR) of LTE (Long Term Evolution) and LTE-Advanced are discussed. In the NR system, a flexible duplex that flexibly controls resources used for downlink communication and uplink communication according to generated downlink traffic and uplink traffic is being studied. As the flexible duplex, there are, for example, a TDD scheme (hereinafter referred to as dynamic TDD (Time Division Duplex)) for dynamically switching uplink resources and downlink resources in the time domain as shown in FIG. 1A, a FDD scheme for dynamically switching uplink resources and downlink resources in the frequency domain as shown in FIG. 1B, and a scheme of combining the TDD scheme and the FDD scheme as show in FIG. 1C. Also, full duplex which simultaneously performs uplink communication and downlink communication with the same resource is also being considered. In the following, as an example, the dynamic TDD is described in more detail.

Typically, it is assumed that the deviation between downlink traffic and uplink traffic is greater for smaller cells compared to larger cells. Therefore, by controlling downlink communication and uplink communication independently using the dynamic TDD in each cell, it becomes possible to accommodate traffic more efficiently.

In dynamic TDD, downlink and uplink communication directions are dynamically changed at certain time intervals such as subframe, slot, minislot and so on. That is, as shown in FIG. 2A, in the static TDD applied in LTE, a preconfigured downlink/uplink pattern common among cells is used. On the other hand, in dynamic TDD, a separate downlink/uplink pattern is utilized in each cell as shown in FIG. 2B. Therefore, each cell can dynamically change the downlink and uplink communication directions according to the downlink and uplink traffic volume.

RELATED ART DOCUMENT

Non Patent Document

[NON PATENT DOCUMENT 1] 3GPP TS 36.211 V14.0.0
[NON PATENT DOCUMENT 2] 3GPP TS 36.213 V14.0.0

SUMMARY OF THE INVENTION

Problem to be Solved by the Invention

In the NR system, similarly to the LTE system, it is assumed that downlink control information (DCI: Downlink Control Information) is transmitted by a downlink control channel (for example, PDCCH: Physical Downlink Control Channel).

However, as described above, when adopting the scheme of flexibly controlling resources used for downlink communication and uplink communication for each cell, for example, downlink communication in a certain cell (referred to as a target cell) receives an interference from uplink communication in another cell (called an interfering cell) so that the possibility that the user apparatus in the target cell cannot appropriately receive the downlink control information from the base station increases. If downlink control information cannot be properly received, data transmission and reception cannot be properly performed, and the performance may be degraded.

The present invention has been made in view of the above points, and an object of the present invention is to provide a technique that enables a user apparatus to properly receive downlink control information in a radio communication system that supports a scheme for flexibly controlling resources for use in downlink communication and uplink communication for each cell.

Means for Solving the Problem

According to an embodiment of the present invention, there is provided a base station configured to perform communication with a user apparatus in a radio communication system, including:

a storage unit configured to store configuration information on an aggregated downlink control channel in which a plurality of downlink control channels in a plurality of slots are aggregated; and a transmission unit configured to transmit downlink control information, to the user apparatus, using the aggregated downlink control channel based on the configuration information.

Effect of the Present Invention

According to the disclosed technique, there is provided a technique that enables a user apparatus to properly receive downlink control information in a radio communication system that supports a scheme for flexibly controlling resources for use in downlink communication and uplink communication for each cell.

BRIEF DESCRIPTION OF THE DRAWINGS

FIG. 4C is a diagram showing an example of an UL/DL pattern in dynamic TDD, and shows pattern 3;
FIG. 6 is a diagram for explaining a DL interference pattern in a target cell.

FIG. 13C is a diagram for explaining a DL data assignment method example C;

FIG. 15C is a diagram for explaining an UL data assignment method example 3;

FIG. 16A is a diagram for explaining an UL data assignment method example 4;

FIG. 16B is a diagram for explaining an UL data assignment method example 4;

FIG. 17B is a diagram for explaining an example of a resource for the aggregated DL control channel;

EMBODIMENTS FOR CARRYING OUT THE INVENTION

In the following, an embodiment of the present invention is described with reference to Figures. The embodiment described below is merely an example, and the embodiment to which the present invention is applied is not limited to the embodiment below.

It is assumed that the radio communication system of the present embodiment supports at least the LTE communication scheme. Therefore, when the radio communication system operates, the existing technology prescribed in the existing LTE can be used as appropriate. However, the existing technology is not limited to LTE. Also, "LTE" used in this specification has a broad meaning including LTE-Advanced and schemes after LTE-Advanced unless otherwise specified. Also, the present invention can be applied to communication systems other than LTE.

In the present embodiment, terms such as PDCCH, DCI, subframe, slot, RRC, UE, DCI format, and the like used in the existing LTE are used for convenience of description, but signals and functions similar to these may be referred to by other names.

Also, in the present embodiment described below, an example in the case where the communication system supports the flexible duplex is shown, but the present invention can be applied even when the flexible duplex is not supported.

Configuration of Radio Communication System

Figure 1A:
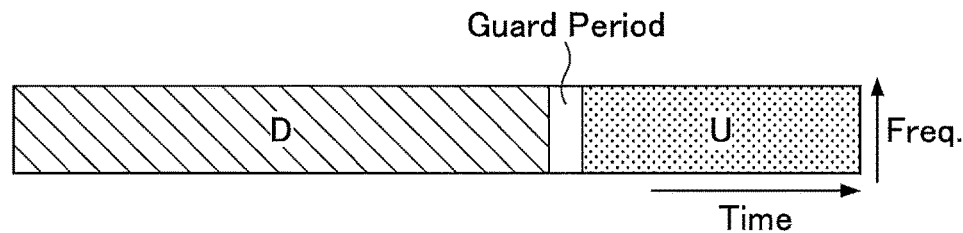
FIG. 1A is a diagram for explaining flexible duplex, and shows TDD.
Figure 1B:
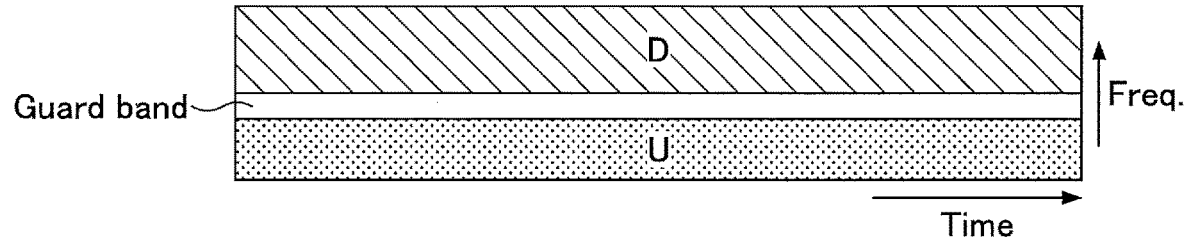
FIG. 1B is a diagram for explaining flexible duplex, and shows FDD.
Figure 1C:
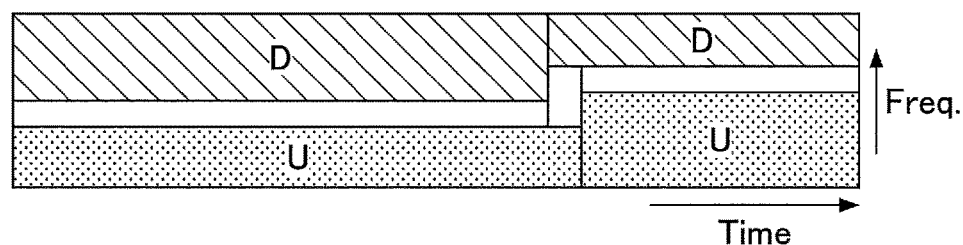
FIG. 1C is a diagram for explaining flexible duplex, and shows combination.
Figure 2A:
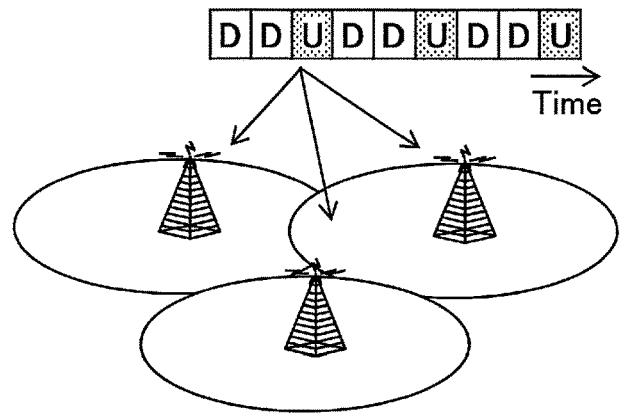
FIG. 2A is a diagram for explaining static TDD.
Figure 2B:
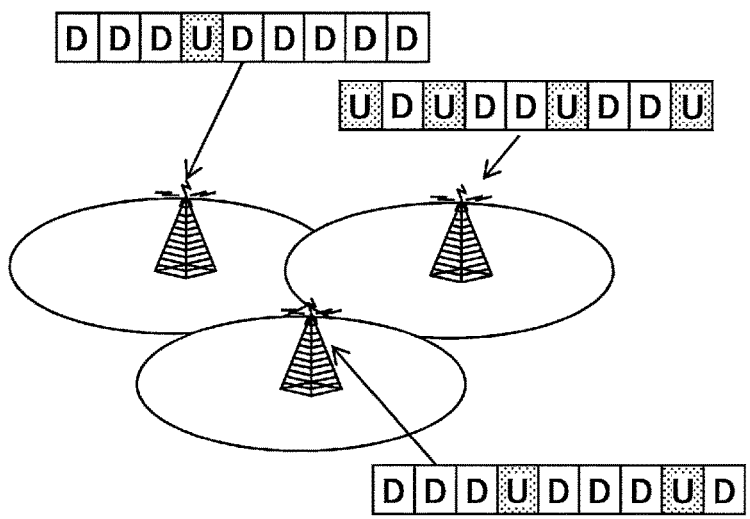
FIG. 2B is a diagram for explaining dynamic TDD.
Figure 3:
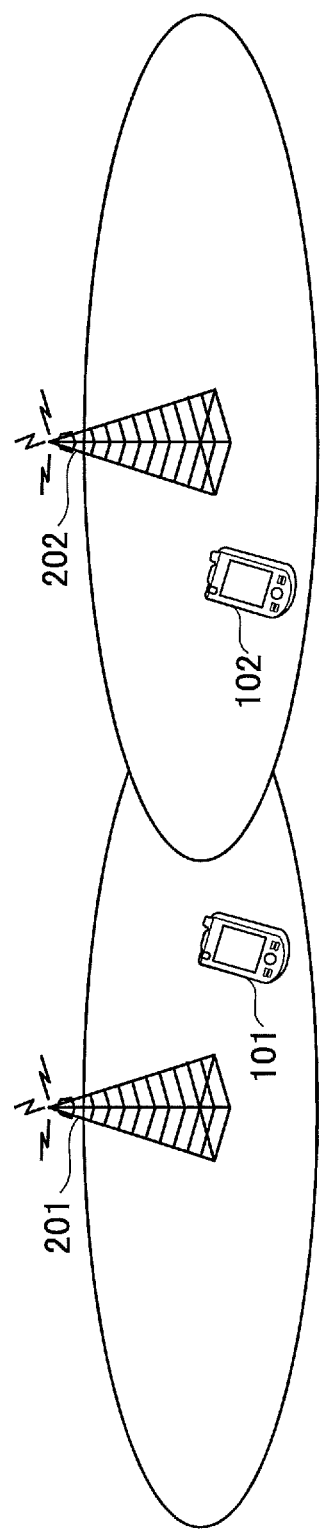
FIG. 3 is a diagram showing a radio communication system in an embodiment of the present invention.

FIG. 3 is a block diagram of a radio communication system in the present embodiment. As shown in FIG. 3, the radio communication system 10 according to the present embodiment includes user apparatuses 101 and 102 (hereinafter collectively referred to as user apparatuses 100) and base stations 201 and 202 (hereinafter collectively referred to as base stations 200). In the following embodiments, the radio communication system 10 supports the flexible duplex that flexibly controls resources used for UL communication and DL communication as described above, and in the present embodiment, description using the dynamic TDD as an example of the flexible duplex is provided mainly. Note that the user apparatus may be referred to as UE, and the base station may be referred to as BS. The present invention can be applied to schemes of flexible duplex other than the dynamic TDD.

The user apparatus 100 is any suitable communication apparatus having a radio communication function such as a smartphone, a mobile phone, a tablet, a wearable terminal, a communication module for M2M (Machine-to-Machine), or the like, and the user apparatus 100 connects to the base station 200 to use various communication services provided by the radio communication system 10.

The base station 200 is a communication apparatus that provides one or more cells and performs radio communication with the user apparatus 100. In the example shown in the figure, two base stations 201, 202 are shown, but in general, a large number of base stations 200 are arranged to cover the service area of the radio communication system 10.

Further, in the radio communication system 10 according to the present embodiment, it is assumed that the cells are synchronized with each other. Therefore, it is assumed that the boundaries of time frames (radio frames, subframes, slots, minislots, etc.) coincide between cells.

For example, when a time position T from the head of a specific slot A is specified in a certain cell and a time position T from the head of the slot A is specified in another cell, the absolute times of both are matched (an error in the range that can be seen matched exists). In the present embodiment, the slot may be referred to as TTI (Transmission Time Interval).

However, the present invention is not limited to the case where the cells are synchronized with each other, and can also be applied to the case where they are not synchronized with each other.

On Configuration of Dynamic TDD

As described above, since the dynamic TDD is used as an example in the present embodiment, a configuration example of the dynamic TDD in the present embodiment is described.

Figure 4A:
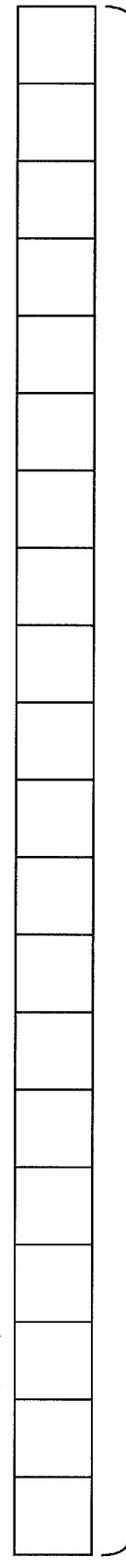
FIG. 4A is a diagram showing an example of an UL/DL pattern in dynamic TDD, and shows pattern 1.
Figure 4B:
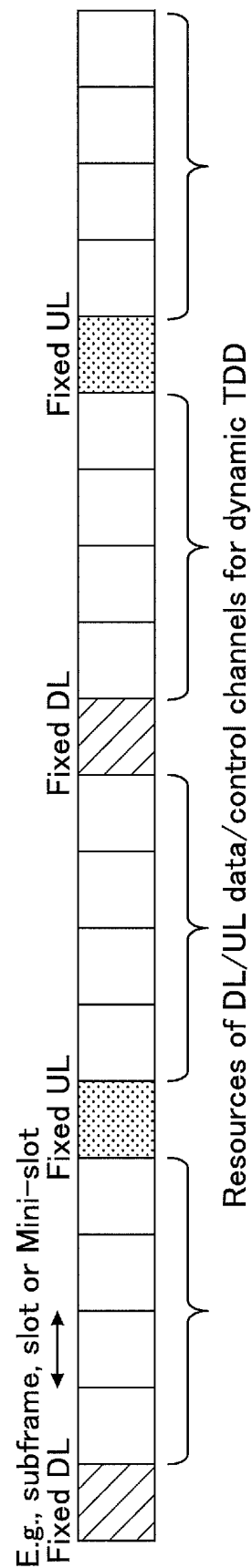
FIG. 4B is a diagram showing an example of an UL/DL pattern in dynamic TDD, and shows pattern 2.

In the dynamic TDD according to the present embodiment, for example, as shown in FIGS. 4A to 4C, by several uplink (UL hereinafter)/downlink (DL hereinafter) patterns, UL communication and DL communication are performed. However, it is not limited to these.

In pattern 1 in FIG. 4A, UL communication/DL communication is possible at all time intervals. The "time interval" here is the time width of the square frame shown in FIG. 4A (same for B and C) (width described as "E.g., subframe, slot or Mini-slot"). This "time interval" may be referred to as TTI.

In pattern 2, UL communication/DL communication is fixedly set at some time intervals, and only the set communication direction is allowed at the time interval. On the other hand, it is possible to switch between UL communication and the D1 communication at other time intervals. In pattern 3, UL communication/DL communication is fixedly set for a part of time intervals and for a certain section within a time interval (in the illustrated example, the sections of both ends within the time interval is fixedly set for DL communication and UL communication), so that only the set communication direction is allowed in the time interval. On the other hand, UL/DL communication is possible at other time intervals.

In the present embodiment, as an example, an embodiment in which the technique of the present invention is applied to pattern 3 is described. Note that, in the pattern 3, the time section in which UL communication/DL communication is fixedly set may not be provided other than in sections of both end within the time interval.

Figure 5:
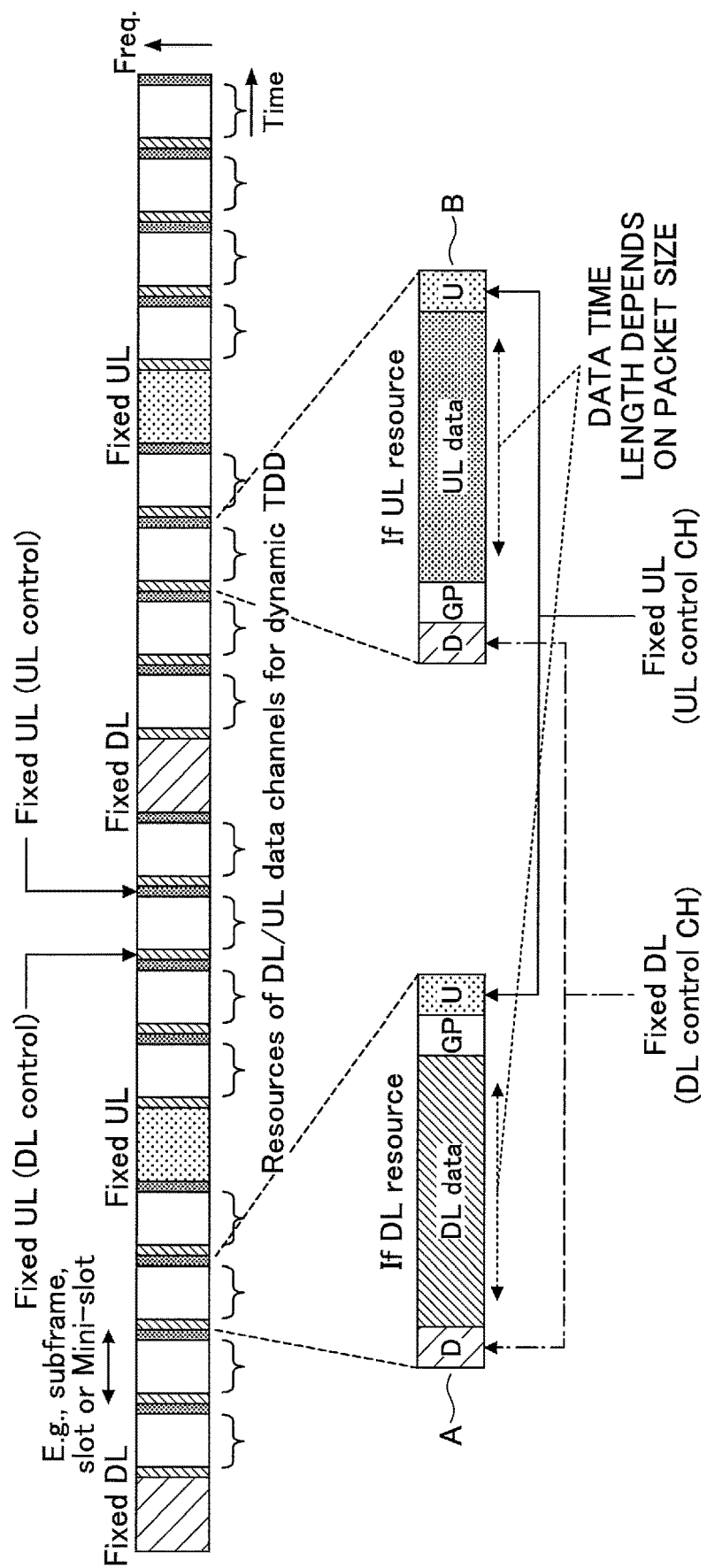
FIG. 5 is a diagram showing an example of a frame configuration in dynamic TDD.

FIG. 5 is a diagram showing the frame configuration of the pattern 3 shown in FIG. 4C in more detail. Hereinafter, for convenience of explanation, the above-mentioned "time interval" is referred to as a slot. However, the slot used below may be replaced with a TTI (transmission time interval), a unit time length frame, a subframe, a minislot, or a radio frame.

The time length of the slot may be a fixed time length that does not change as time elapses, or it may be a time length that varies depending on the packet size and so on. When multiple consecutive slots are used for data communication depending on the packet size and the like, the plurality of consecutive slots may be regarded as one slot.

As shown in FIG. 5, in this example, one slot includes a head time section for downlink control channel (DL control channel section), a time section for data communication (data section) and a last time section for uplink control channel (UL control channel section). Also, a guard section (GP: guard period) is provided between DL and UL for switching.

Whether a data section in a slot is DL or UL is semistatically determined, for example. In this case, for example, an UL or DL pattern and the like in a slot set (example: pattern indicated in non-patent document 1) is notified by an upper layer signaling (RRC signaling and the like) from the base station 200 to the user apparatus 100.

Whether a data section of a slot is DL or UL is may be dynamically determined. In this case, for example, in the DL control channel section in slots shown as A, B of FIG. 5, the user apparatus 100 receives, from the base station 200, downlink control information including designation of DL or UL by a DL control channel, so that the user apparatus 100 performs UL data transmission or DL data reception in accordance with the designation.

In the case in which the data section in a slot is DL as indicated by A, the user apparatus 100 transmits, for example, ACK/NACK for DL data in an UL control channel section of the slot. Also, as indicated by B, when the data section of slot is UL, the user apparatus 100 transmits, for example, ACK/NACK for DL data received before the slot in an UL control channel section of the slot.

On Interference Pattern

In the present embodiment, in the target cell (that may be referred to as a serving cell), it is possible that the user apparatus 100 receives the downlink control information (that is also referred to as DCI (Downlink Control Information) hereinafter) transmitted from the base station 200 of the target cell without being influenced by the cross link interference from the other cell (interference cell). For explaining the mechanism that enables it, first, interference patterns of DL communication are described with reference to FIG. 6. FIG. 6 also shows a base station 203 and a user apparatus 103 in addition to the base stations 201 and 202 and the user apparatuses 101 and 102. In FIG. 6, the cell of the base station 201 is the target cell, and the cell of the base station 202 and the cell of the base station 203 are both interference cells. As shown in FIG. 6, a DL signal from the base station of the neighboring cell (the base station 202 in FIG. 6) and the UL signal from the user apparatus of the neighboring cell (the user apparatus 103 in FIG. 6) are interfered. In particular, the interference caused by the UL signal from the user apparatus of the neighboring cell (user apparatus 103 in FIG. 6) is an example of DL and UL cross-link interference. For example, the UL data channel from the UE of the interfering cell causes interference to the DL control channel of the target cell, so the effect is large.

Figure 7A:
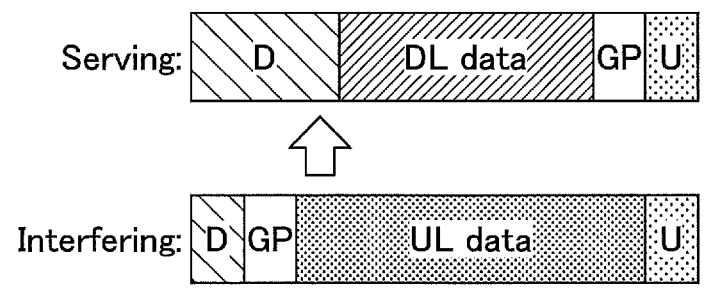
FIG. 7A is a diagram showing an example when receiving cross-link interference in DL.

FIG. 7A shows an example where the UL data channel of the user apparatus of the interfering cell becomes an interference to the DL control channel of the target cell in a slot. In the case of FIG. 7A, since the time length of the DL control channel section is long, a part of the DL control channel section overlaps with the UL data section of a slot in the interfering cell. Therefore, interference occurs.

Figure 7B:
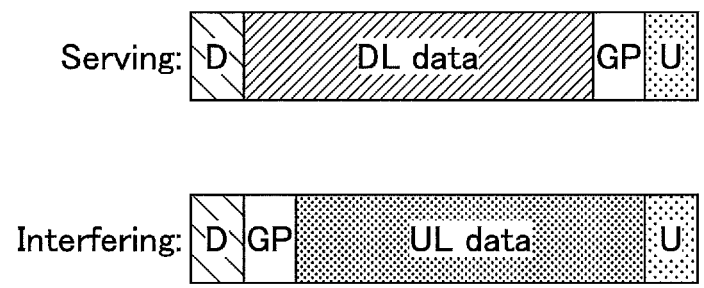
FIG. 7B is a diagram showing an example when not receiving cross-link interference in DL.

In order to avoid such interference shown in FIG. 7A, it can be considered to use the same (fixed) position and time length (the number of OFDM symbols and the like) between cells (between base stations) as shown in FIG. 7B. However, in this case, it can be considered that the high-traffic cell and the low-traffic cell use the same amount of DL control channels, and the overall resource utilization efficiency decreases. Therefore, in the present embodiment, an aggregated DL control channel (Aggregated Downlink Control Channel) described below is used. The aggregated DL control channel may be referred to as aggregated DL control channel.

In the radio communication system of this embodiment in which the aggregated DL control channel is used, as shown in FIG. 7B, it is assumed that the position and the time length of the DL control channel section in each slot are the same between cells. This premise is an example and is not limited to this premise. In each cell (each base station), the position and the time length of the DL control channel section may be the same or may be different between slots, however, in the example described below, an example is shown in which the position and the time length of the DL control channel section are the same between slots. Also, in the following, a channel transmitted in the DL control channel section of one slot is described as one DL control channel.

Outline of Aggregated DL Control Channel

An outline of the aggregated DL control channel is described with reference to FIGS. 8A and 8B. The aggregated DL control channel consists of DL control channels of a plurality of slots. For example, in the example of FIGS. 8A and 8B, DL control channels of three slots are aggregated so that one aggregated DL control channel is configured. Note that, in FIGS. 8A and 8B, the horizontal axis is time and the vertical axis is frequency. The width of the band in the vertical direction is, for example, the system bandwidth. Same applies to the following Figures.

For example, the resource amount occupied by the aggregated DL control channel is reported from the base station 200 to the user apparatus 100 by DCI, MAC signal, broadcast information, or higher layer signaling, so that the user apparatus 100 uses the channel of the reported resource amount as an aggregated DL control channel. For example, the user apparatus 100 searches for DCI in the resource region of the aggregated DL control channel. Note that, in the present embodiment, the time resource amount is focused on as a resource amount, however, the recourse amount in the frequency direction may be included so that the amount may be reported by a higher layer signaling and the like.

The designation content of the resource amount is a number of slots, for example. For example, when three slots are designated as the resource amount, a channel in which DL control channels of three slots are aggregated is used as an aggregated DL control channel. Also, the designation content of the resource amount may be the number of OFDM symbols. For example, it is assumed that the number of OFDM symbols of the DL control channel of each slot is predetermined as K, or that the number of OFDM symbols of the DL control channel of each slot is specified from the base station 200 to the user apparatus 100 as K. At this time, for example, if 3K is notified from the base station 200 to the user apparatus 100 as designation of the resource amount of the aggregated DL control channel, the user apparatus 100 uses three slots of DL control channels as an aggregated DL control channel. The base station 200 holds designated content (configuration information) designated to the user apparatus 100, so that the base station 200 uses the three slots of DL control channels as the aggregated DL control channel for the user apparatus 100.

When using a plurality of slots of DL control channels as the aggregated DL control channel, the plurality of slots may not be continuous. Also, as the designation of the resource amount and the like from the base station 200, it may be UE specific or it may be UE common (Cell specific).

For example, the base station 200 can map a DCI to DL control channels of all slots that form the aggregated DL control channel and transmit it. Also, the base station 200 can map a DCI to DL control channels of a part of slots of DL control channels in all slots that form the aggregated DL control channel, and transmit it.

Figure 8A:
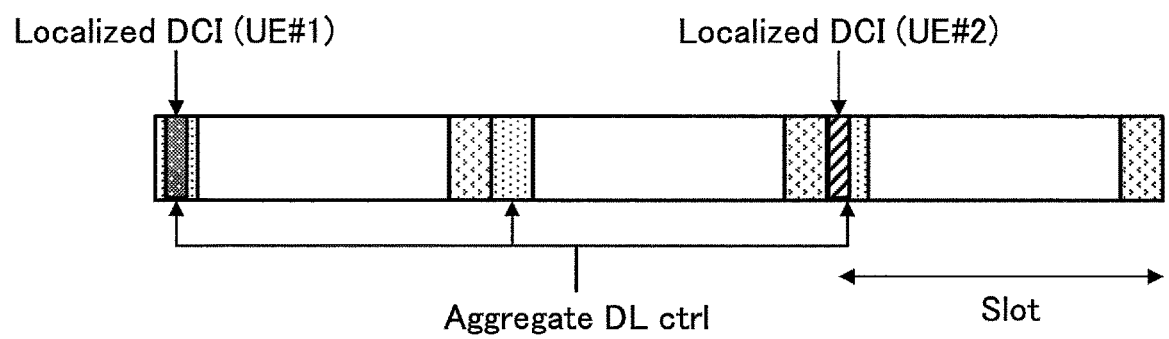
FIG. 8A is a diagram for explaining outline of an aggregated DL control channel.

The mapping example shown in FIG. 8A is an example for mapping one DCI to a DL control channel of one slot that forms the aggregated DL control channel. The DCI mapped in this way is referred to as Localized DCI in the present embodiment. The one DCI is a DCI to which one CRC is attached for error detection, for example.

Figure 8B:
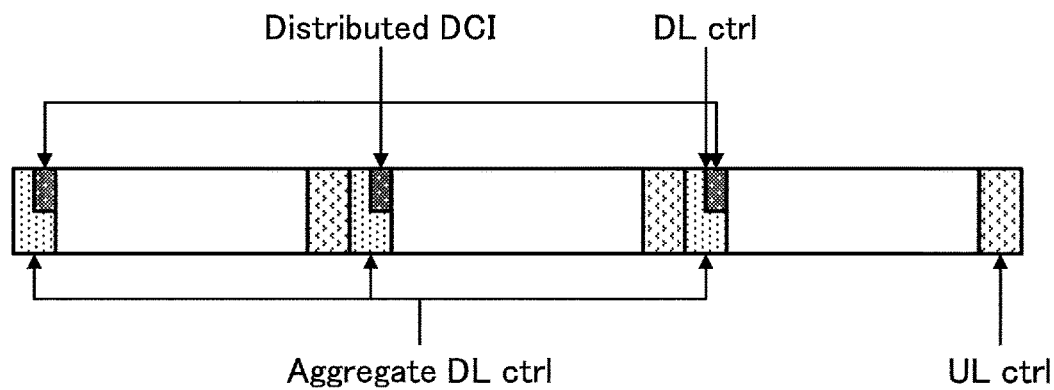
FIG. 8B is a diagram for explaining outline of an aggregated DL control channel.

The mapping example shown in FIG. 8B is an example in which the base station 200 maps one DCI to DL control channels of a plurality of slots forming an aggregated DL control channel. The DCI mapped in this way is referred to as Distributed DCI in the present embodiment. In the Distributed DCI shown in FIG. 8B, the user apparatus 100 performs decoding processing and the like of the DCI by assuming that one DCI is mapped to the aggregated DL control channel (example: DL control channels of three slots).

By introducing the aggregated DL control channel of the present embodiment, it is possible to flexibly change the resource amount of the DL control channel that can be used for transmission of DCI while avoiding cross-link interference from the interfering cell. As a result, the resource use efficiency of the system can be improved.

Operation Example of the System

Figure 9:
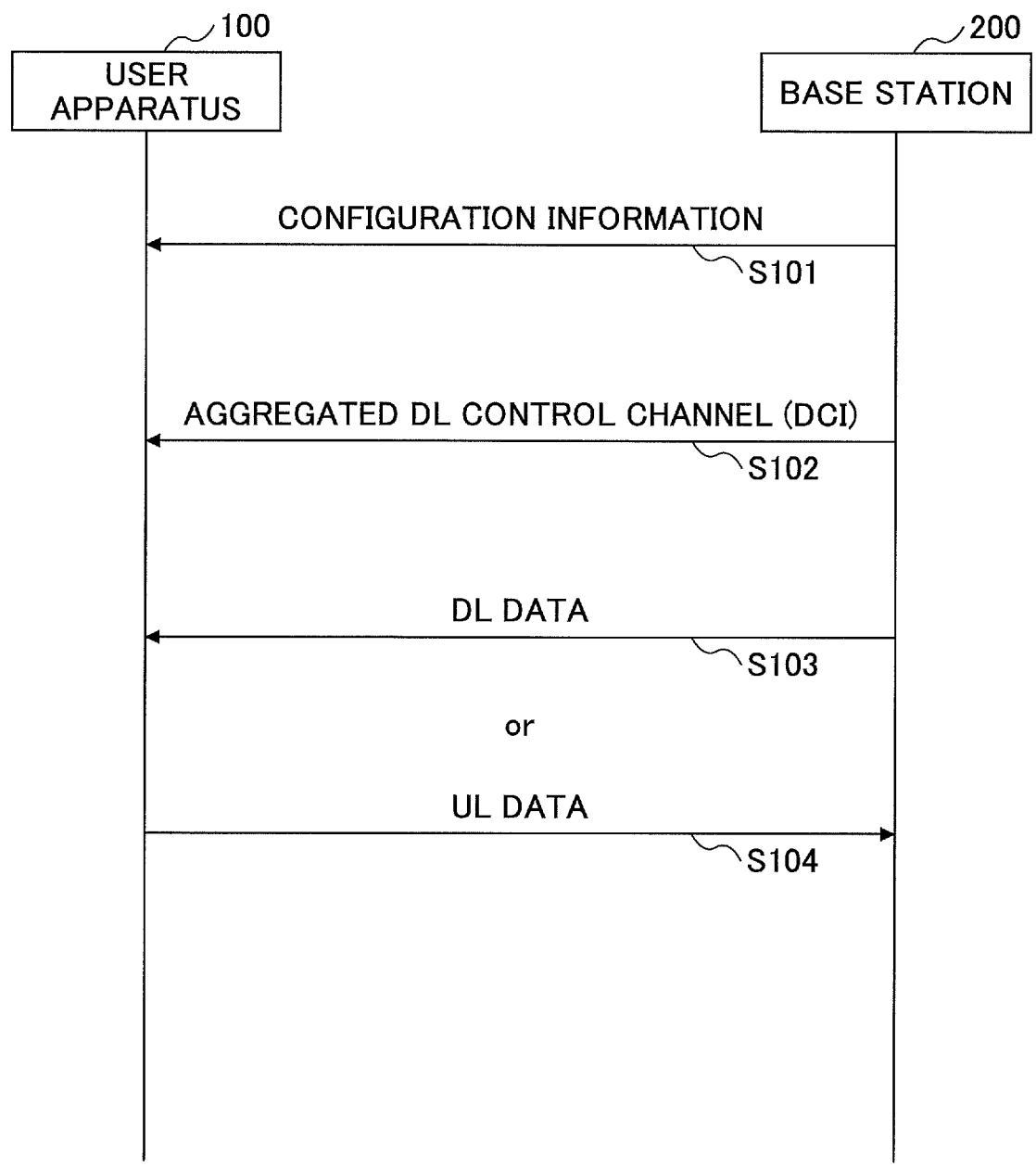
FIG. 9 is a diagram for explaining an operation example of the system.

A basic operation example of the system according to the present embodiment is described with reference to FIG. 9. In step S101, configuration information is transmitted from the base station 200 to the user apparatus 100. The configuration information includes all or a part of designation of a resource amount of the aggregated DL control channel, designation of transmission method of DCI, and designation of DL/UL data assignment method. Also, information other than these may be included. The configuration information is transmitted by an RRC signal, a MAC signal or broadcast information. Also, the configuration information may be transmitted by a DCI in step S102. Also, the configuration information may be preconfigured in the base station 200 and the user apparatus 100.

The user apparatus 100 holds, in a storage unit, the configuration information notified from the base station (or preconfigured configuration information), and also the base station 200 holds the configuration information in a storage unit. The base station 200 transmits a DCI by the aggregated DL control channel based on the configuration information. Also, the user apparatus 100 performs operation of receiving a DCI by the aggregated DL control channel based on the holding configuration information. For example, in the case in which the base station 200 uses an aggregated DL control channel including three slots of DL control channels for the user apparatus 100, the user apparatus 100 can recognize that the DCI is transmitted by the aggregated DL control channel including three slots of DL control channels from the base station 200 based on the configuration information.

In step S102, a DCI is transmitted by the aggregated DL control channel from the base station 200 to the user apparatus 100 by the method according to the configuration information.

Then, for example, the user apparatus 100 receives DL data by a DL resource designated by the DCI (step S103). Or, the user apparatus 100 transmits UL data by an UL resource designated by the DCI (step S104).

Hereinafter, specific examples of processing methods of DCI transmission and the like by the aggregated DL control channel are described. The examples described below can be implemented by arbitrarily combining them as long as there is no inconsistency.

DCI Transmission Method Example 1

Figure 10:
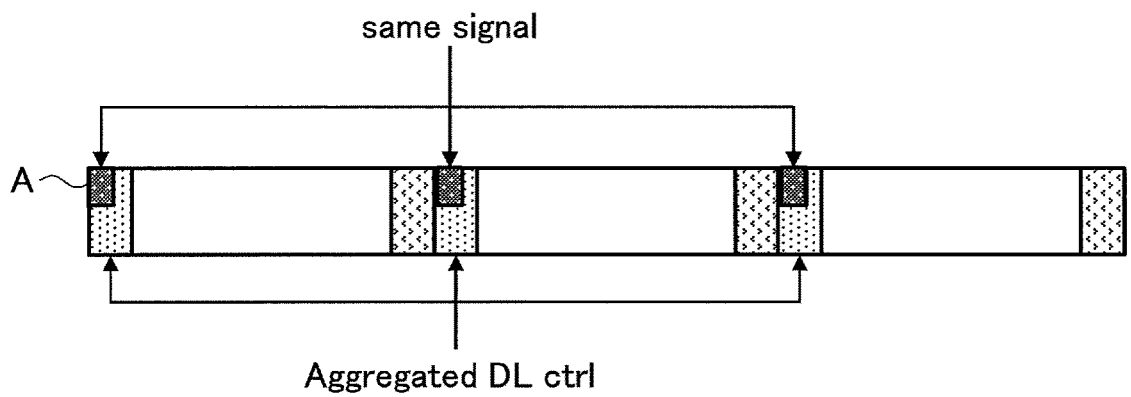
FIG. 10 is a diagram for explaining a DCI transmission method example 1.

Next, examples of methods for transmitting a DCI from the base station 200 to the user apparatus 100 are described.
<DCI Transmission Method Example 1>
FIG. 10 is a diagram for explaining the DCI transmission method example 1. In the DCI transmission method example 1, the base station 200 repeatedly transmits one DCI (a plurality of DCIs may be transmitted) for the user apparatus 100. The repetition is an example of the Distributed DCI. In the example of FIG. 10, the DCI is repeatedly transmitted three times by using three slots. Note that the number of times of repetition is designated from the base station 200 to the user apparatus 100 by the configuration information of step S101 of FIG. 9, for example. Also, the number of times of repetition may be designated by the first DCI (DCI indicated by A in the example of FIG. 10).

For example, the base station 200 may determine the number of times of repetition for the user apparatus 100 based on reception quality (example: RSRQ, RSRP, CQI, or RS-SINR) of the user apparatus 100 reported from the user apparatus 100. For example, if the reception quality is bad, the number of times of repletion is increased.

As described above, by performing repeated transmission, even when reception quality is not good, the user apparatus 100 can receive the DCI.

<DCI Transmission Method Example 2>

Figure 11A:
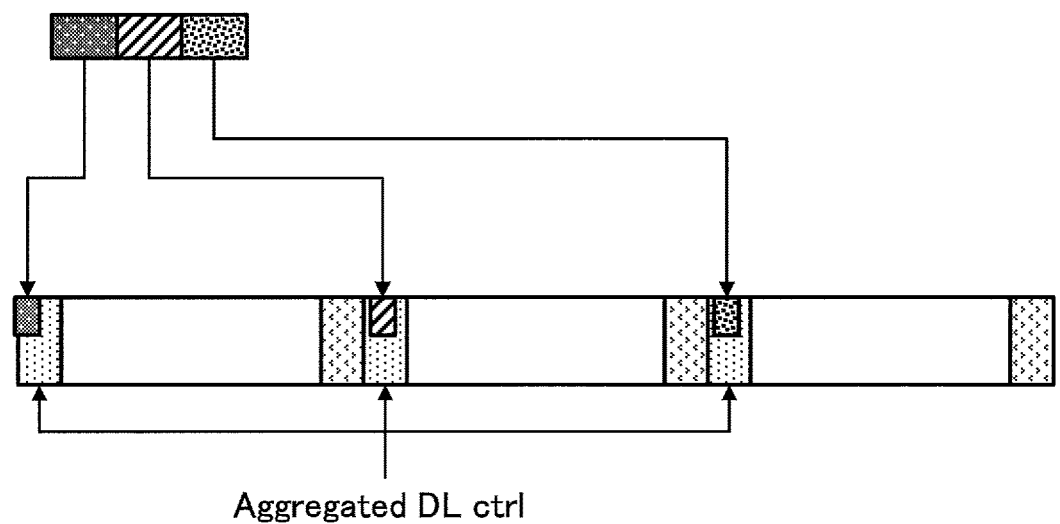
FIG. 11A is a diagram for explaining a DCI transmission method example 2.
Figure 11B:
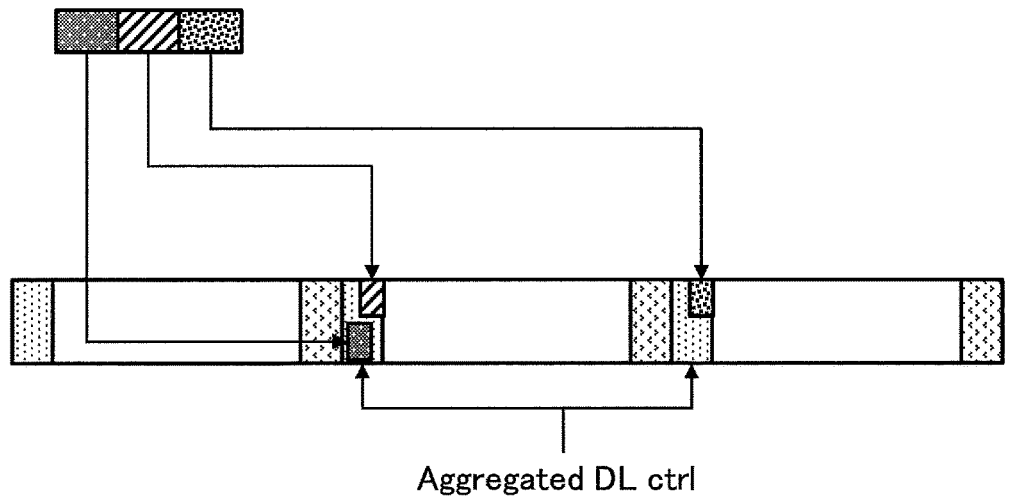
FIG. 11B is a diagram for explaining a DCI transmission method example 2.

FIGS. 11A and 11B are diagrams for explaining the DCI transmission method example 2. Also, the DCI transmission method example 2 is an example of the before-mentioned Distributed DCI. In the DCI transmission method example 2, the base station 200 divides a DCI for the user apparatus 100 into a plurality of parts, maps the plurality of divided parts to DL control channels of a plurality of slots that form an aggregated DL control channel, and transmits the parts.

In the examples of FIGS. 11A and 11B, the DCI is divided into three. As a dividing method, for example, there are division in units of symbols, division in units of codewords, and division in units of information bits. Also, division may be performed in units of content (example: RB Assignment, TPC, HARQ, Precoding Information).

In the example of FIG. 11A, the base station 200 maps each of the three parts obtained by dividing to a DL control channel of a different slot. On the other hand, in the example of FIG. 11B, since the aggregated DL control channel is formed by two slots of DL control channels, two divided parts of the three divided parts are mapped to the DL control channel of one slot, and the remaining one divided part is mapped to a DL control channels of another slot.

As described above, by transmitting the DCI by dividing it, a DCI of large information amount can be transmitted. Note that the before-mentioned repeated transmission may be applied to each divided part.

<Example for Using Frequency Hopping>

Figure 12:
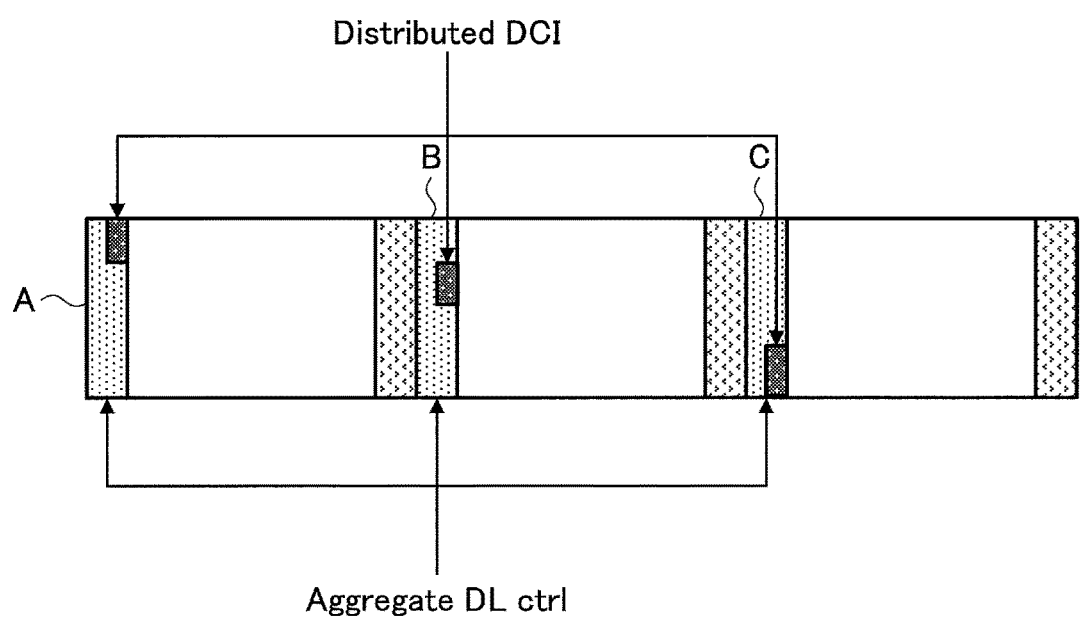
FIG. 12 is a diagram showing an example for transmitting DCI using frequency hopping.

As shown in FIG. 12, in a case in which the Distributed DCI is used, the base station 200 can apply frequency hopping among a plurality of DL control channels that form the aggregated DL control channel. In the example of FIG. 12, the frequency position of the mapped DCI (one DCI or divided DCI) is different among the DL control channel A, the DL control channel B and the DL control channel C that form the aggregated DL control channel.

As to the hopping pattern, it may be configured from the base station 200 to the user apparatus 100 by configuration information, or it may be preconfigured in the base station 200 and the user apparatus 100. Also, each of the base station 200 and the user apparatus 100 may calculate a hopping pattern using a parameter (example: UE-ID) specific to the user apparatus 100, so that the base station 200 may transmit a DCI using the hopping pattern and the user apparatus 100 may receive the DCI using the hopping pattern.

Example of Method for Assigning DCI to an Aggregated DL Control Channel

Next, an example of a method for assigning a DCI to an aggregated DL control channel is described.

As a unit for assigning a DCI to an aggregated control channel, CCE (Control Channel Element) can be used. The CCE is formed by 9 consecutive REGs (Resource Element Groups), and the REG is formed by 4 consecutive resource elements. However, in the present embodiment, a definition of CCE different from the definition of CCE defined on LTE may be used. For example, 12 consecutive resource elements may be defined as REG, and a CCE may be defined as one or more sequential REGs. The number of CCEs assigned to one DCI may be referred to as an aggregation level. The allocation of CCEs in the DCI may be determined based on the index information provided to each CCE. For example, it is possible to assign the DCI of each user apparatus to each CCE by the method described in Section 9 of Non-Patent Document 2.

The index of each CCE included in the aggregated DL control channel may be a serial number in all slots. For example, if the number of CCEs included in the downlink control channel of the first slot included in the aggregated DL control channel is 80, then each CCE is assigned an index of 0 to 79. If the number of CCEs in the second slot is 80, then each CCE is given indexes 80 to 159.

Or, the CCE index may be added independently for each slot included in the aggregated DL control channel. For example, CCE indexes of the first slot may be 0-79, and also CCE indexes of the next slot may be 0-79. The index providing method described above may be configured by higher layer signaling or broadcast information transmitted from the base station 200 to the user apparatus 100. Further, the number of slots may be preconfigured in the base station 200 and the user apparatus 100.

The CCE included in the aggregate DL control channel may be divided into a plurality of groups. For example, in the existing LTE, CCEs included in a particular subframe can be divided to a common search space in which DCI can be assigned for all user apparatuses connected to the base station and to a UE specific search space in which DCI can be assigned only for a specific user apparatus. Note that the UE specific search space can be calculated based on information (UE-ID, for example) specific for each user apparatus, and it is permitted that a CCE is included in a plurality of UE specific search spaces at the same time.

The common search space (or the user specific search space) may be equally assigned for all slots included in the aggregated DL control channel, or may be assigned limitedly to a part of slots. For example, in the case where the index of the CCE is independent for each slot, by setting the CCE index (for example, 0 to 15) of a part of each slot as the common search space, it is possible to allocate the common search space equally to each slot. Or, when the CCE index is set as a sequential number, it is possible to limit the common search space to a part of the slot by setting a certain CCE index (for example, 0 to 15 of the top slot) of a part of CCEs as the common search space. The common search space (and user-specific search area) may be configured by higher layer signaling or broadcast information transmitted from the base station 200 to the user apparatus 100. Also, the number of slots may be preconfigured in the base station 200 and the user apparatus 100.

Example of DL Data Assignment Method

Next, an example of DL data assignment method when using the aggregated DL control channel is described. In the diagrams described below, the assigned data resource may be the entire resource (example: frequency width=system bandwidth, time length=data section of the slot) in a slot, or <DL Data Assignment Method Example 1>

Figure 13A:
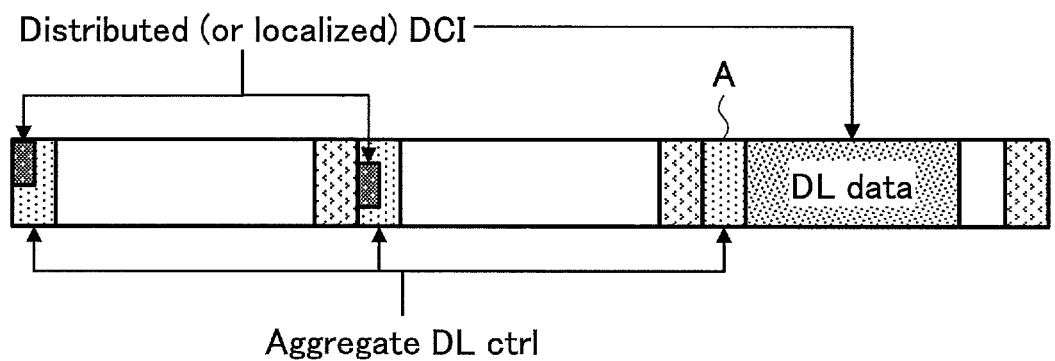
FIG. 13A is a diagram for explaining a DL data assignment method example 1.

FIG. 13A shows the DL data assignment method example 1. In the DL data assignment method example 1, the resource of DL data is assigned to a data section right after the aggregated DL control channel. In the example of FIG. 13A, in the aggregated DL control channel formed by three slots of DL control channels, the resource of DL data is assigned to the slot in which the last DL control channel indicated by A exists at the head.

For example, a DCI transmitted by the aggregated DL control channel includes information indicating a resource in the slot in which the DL control channel indicated by A exists at the head. In the DL data assignment method example 1, the user apparatus 100 assumes that a data resource is assigned after the aggregated DL control channel so as to grasp the DL data resource in the slot in which the DL control channel indicated by A exists at the head based on information of the DCI.

<DL Data Assignment Method Example 2>

Figure 13B:
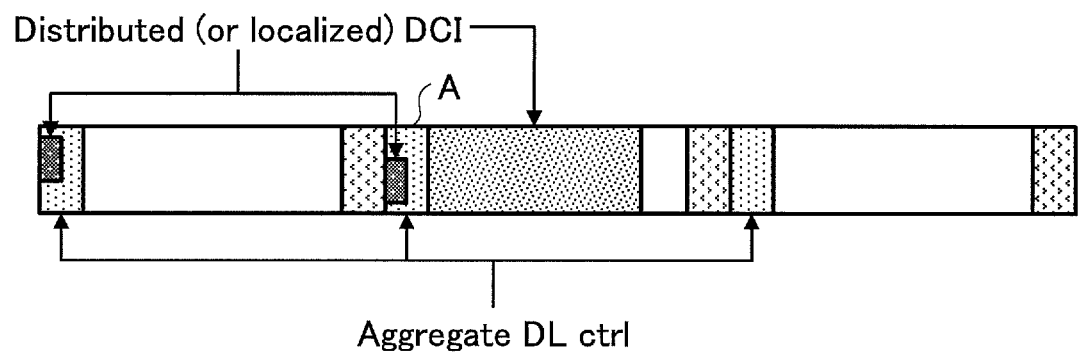
FIG. 13B is a diagram for explaining a DL data assignment method example 2.

FIG. 13B shows the DL data assignment method example 2. In the DL data assignment method example 2, the resource of DL data is assigned to a data section right after DCI. In the example of FIG. 13B, in the aggregated DL control channel formed by three slots of DL control channels, the resource of DL data is assigned to the data section right after end of transmission of DCI for the user apparatus 100 by the DL control channel indicated by A. For example, a DCI transmitted by the aggregated DL control channel includes information indicating a resource in the slot in which the DL control channel indicated by A exists at the head. The user apparatus 100 assumes that a data resource is assigned after the DCI for which transmission (reception) has completed so as to grasp the DL data resource in the slot in which the DL control channel indicated by A exists at the head based on information of the DCI.

As shown in the above-mentioned examples 1-2, by predetermining a slot to which the DL data resources is assigned, the signaling amount can be reduced.

<DL Data Assignment Method Example 3>

FIG. 13C shows the DL data assignment method example 3. In the DL data assignment method example 3, a slot to which DL data resource is assigned is flexibly configured from the base station 200 to the user apparatus 100 by a DCI or by higher layer signaling.

In the example shown in FIG. 13C, a slot indicated by A is designated as a slot to which DL data resource is assigned by the DCI transmitted by the aggregated DL control channel. Also, the DCI includes designation of the resource of DL data in the slot. The user apparatus 100 receives DL data in the slot A based on the designation by the DCI.

By the above-mentioned method, the resource of the DL data can be flexibly assigned.

<DL Data Assignment Method Example 4>

The resource (resource may be referred to as channel) of DL data may be assigned to one slot like the above-mentioned example, or may be assigned to a plurality of slots. As to the number of slots (time length of DL data) to which the DL data resource is assigned is configured by a DCI or higher layer signaling transmitted from the base station 200 to the user apparatus 100. The number of the slots may be preconfigured in the base station 200 and the user apparatus 100.

Figure 14A:
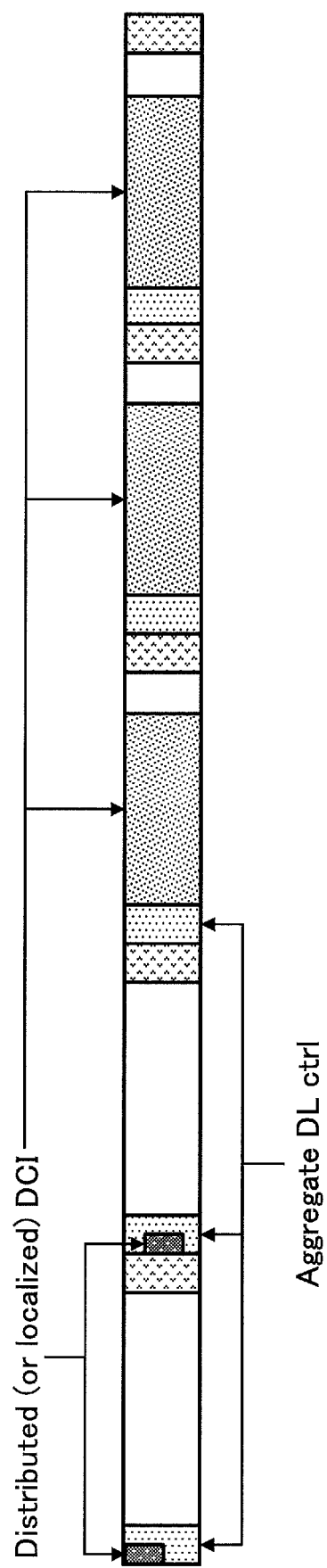
FIG. 14A is a diagram for explaining a DL data assignment method example 4.

Also, the number of slots to which the resource of DL data is assigned may be determined to be the same as the number of slots that form the aggregated DL control channel. In this case, for example, when the number of DL control channels (number of slots) constituting the aggregated DL control channel is 3, the user apparatus 10 assumes, for example, that the DL data resource is assigned to a data section of three slots right after the DCI or right after the aggregated DL control channel. FIG. 14A shows an example where the resource of the DL data is assigned to a plurality of slots.

Figure 14B:
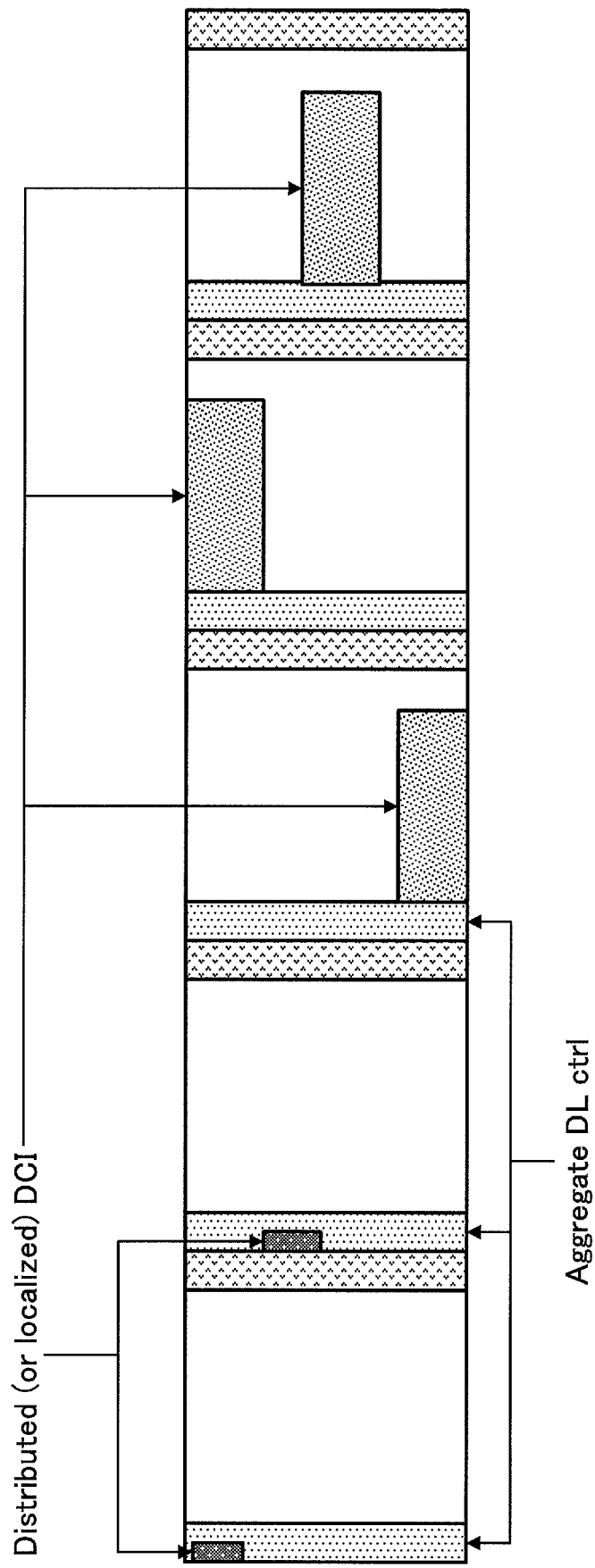
FIG. 14B is a diagram for explaining a DL data assignment method example 4.

As shown in FIG. 14B, frequency hopping may be applied to the resource of DL data. The hopping pattern may be configured by configuration information (DCI, higher layer signaling and the like) from the base station 200 to the user apparatus 100, or may be preconfigured in the base station 200 and the user apparatus 100. Also, the base station 200 and the user apparatus 100 may calculate a hopping pattern using a parameter (example: UE-ID) specific to the user apparatus 100 (UE-specific), the base station 200 may transmit data using the hopping pattern, and the user apparatus 100 may receive data using the hopping pattern.

UL Data Assignment Method

Next, an example of an UL data assignment method when using the aggregated DL control channel is described. In the diagrams described below, the assigned data resource may be the entire resource (example: frequency width=system bandwidth, time length=data section of the slot) in a slot, or it can be a part of the entire resource in the slot. In the Figures, the area to which the data resource can be allocated is indicated by a shaded area or the like.

<UL Data Assignment Method Example 1>

Figure 15A:
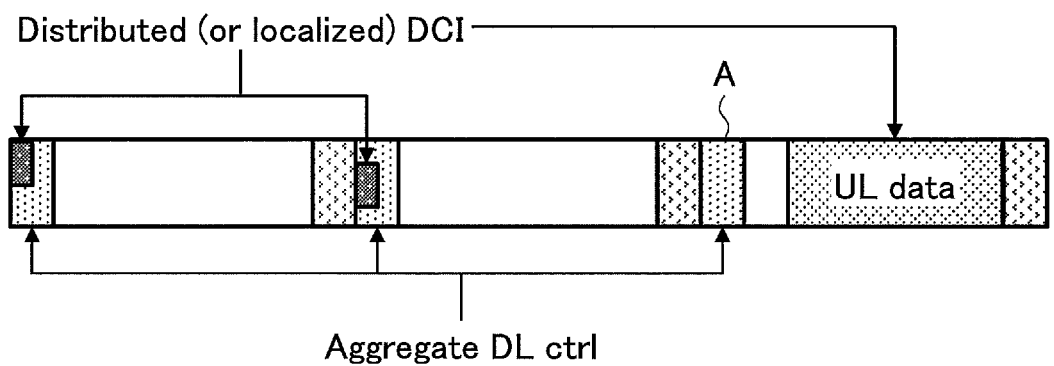
FIG. 15A is a diagram for explaining an UL data assignment method example 1.

FIG. 15A shows the UL data assignment method example 1. In the UL data assignment method example 1, the resource of UL data is assigned to a data section right after the aggregated DL control channel. In the example of FIG. 15A, in the aggregated DL control channel formed by three slots of DL control channels, the resource of UL data is assigned to the slot in which the last DL control channel indicated by A exists at the head.

For example, a DCI transmitted by the aggregated DL control channel includes information indicating a resource in the slot in which the DL control channel indicated by A exists at the head. In the UL data assignment method example 1, the user apparatus 100 assumes that a data resource is assigned after the aggregated DL control channel so as to grasp the UL data resource in the slot in which the DL control channel indicated by A exists at the head based on information of the DCI.

<UL Data Assignment Method Example 2>

Figure 15B:
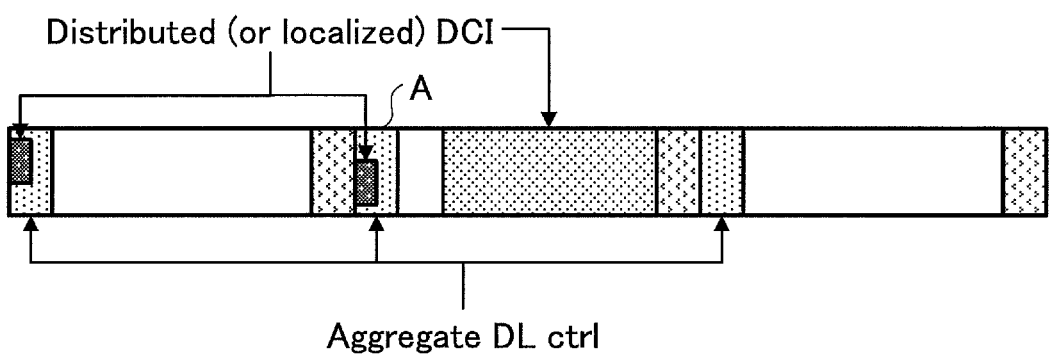
FIG. 15B is a diagram for explaining an UL data assignment method example 2.

FIG. 15B shows the UL data assignment method example 2. In the UL data assignment method example 2, the resource of UL data is assigned to a data section right after DCI. In the example of FIG. 15B, in the aggregated DL control channel formed by three slots of DL control channels, the resource of UL data is assigned to the data section right after end of transmission of DCI for the user apparatus 100 by the DL control channel indicated by A. For example, a DCI transmitted by the aggregated DL control channel includes information indicating a resource in the slot in which the DL control channel indicated by A exists at the head. The user apparatus 100 assumes that a data resource is assigned after the DCI for which transmission (reception) has completed so as to grasp the UL data resource in the slot in which the DL control channel indicated by A exists at the head based on information of the DCI.

As shown in the above-mentioned examples 1-2, by predetermining a slot to which the UL data resources is assigned, the signaling amount can be reduced.

<UL Data Assignment Method Example 3>

FIG. 15C shows the UL data assignment method example 3. In the UL data assignment method example 3, a slot to which UL data resource is assigned is flexibly configured from the base station 200 to the user apparatus 100 by a DCI or by upper layer signaling.

In the example shown in FIG. 15C, a slot indicated by A is designated as a slot to which UL data resource is assigned by the DCI transmitted by the aggregated DL control channel. Also, the DCI includes designation of the resource of UL data in the slot. The user apparatus 100 transmits UL data in the slot A based on the designation by the DCI.

By the above-mentioned method, the resource of the UL data can be flexibly assigned.

In the UL data assignment method example 3, the position of the slot in which the UL data resource is assigned is designated by DCI. However, the position of the slot in which the UL data resource is assigned may be determined fixedly. For example, N (N is a natural number) may be fixedly determined, so that the user apparatus 100 may transmit UL data by a slot after N slots (after 3 slots in the example of FIG. 15C) from the slot in which DCI is received.

<UL Data Assignment Method Example 4>

The resource (resource may be referred to as channel) of UL data may be assigned to one slot like the above-mentioned example, or may be assigned to a plurality of slots. As to the number of slots (time length of UL data) to which the UL data resource is assigned is configured by a DCI or upper layer signaling transmitted from the base station 200 to the user apparatus 100. The number of the slots may be preconfigured in the base station 200 and the user apparatus 100.

Also, the number of slots to which the resource of UL data is assigned may be determined to be the same as the number of slots that form the aggregated DL control channel. In this case, for example, when the number of DL control channels (number of slots) constituting the aggregated DL control channel is 3, the user apparatus 10 assumes, for example, that the UL data resource is assigned to a data section of three slots right after the DCI or right after the aggregated DL control channel. FIG. 14A shows an example where the resource of the UL data is assigned to a plurality of slots.

As shown in FIG. 16B, frequency hopping may be applied to the resource of UL data. The hopping pattern may be configured by configuration information (DCI, higher layer signaling and the like) from the base station 200 to the user apparatus 100, or may be preconfigured in the base station 200 and the user apparatus 100. Also, the base station 200 and the user apparatus 100 may calculate a hopping pattern using a parameter (example: UE-ID) specific to the user apparatus 100 (UE-specific), the base station 200 may receive data using the hopping pattern, and the user apparatus 100 may transmit data using the hopping pattern.

Resource Example of Aggregated DL Control Channel

Next, an example of the resource of the aggregated DL control channel is described from the viewpoint of blind decoding of DCI by the user apparatus 100.

Figure 17A:
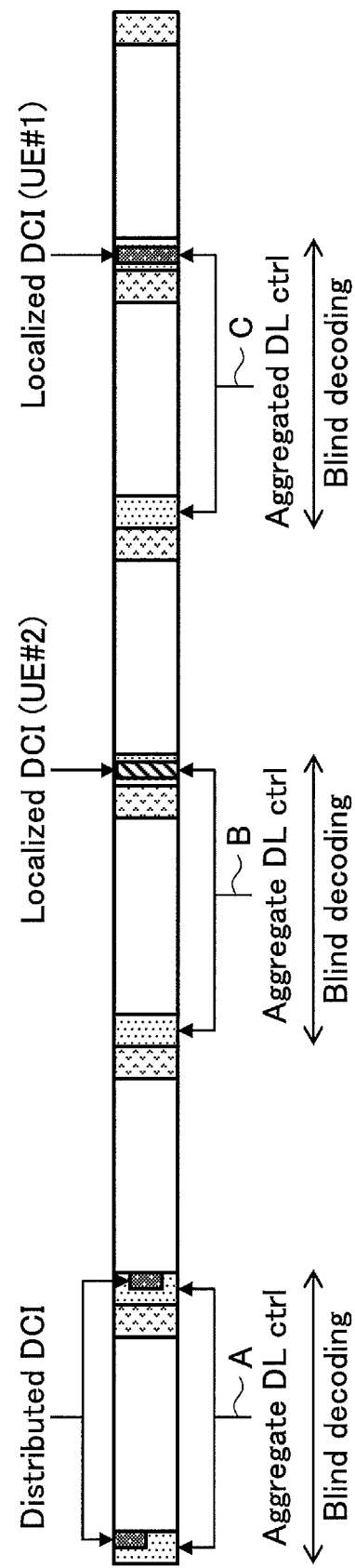
FIG. 17A is a diagram for explaining an example of a resource for the aggregated DL control channel.

The example of FIG. 17A is an example in which DL control channels (resources) are not overlapped between aggregated DL control channels formed by DL control channels of a plurality of slots. For example, in FIG. 17A, the two aggregated DL control channels are separated and not overlapped as indicated by A, B and C. In this case, the user apparatus 100 monitors (blindly decodes) DCI using the resource of the aggregated DL control channel in alternate slots for detecting the DCI.

The example shown in FIG. 17B is an example in which overlapping of DL control channels (resources) is allowed between aggregated DL control channels each being formed by a plurality of slots of DL control channels. For example, in the FIG. 17B, the aggregated DL control channel indicated by A and the aggregated DL control channel indicated by B overlap at a part of the DL control channel indicated by C. In this case, the user apparatus 100 monitors (blindly decodes) DCI using the resource of each aggregated DL control channel without alternating slots.

Example for Transmitting a Plurality of DCIs

The base station 200 may transmit a plurality of DCIs to the user apparatus 100 using the aggregated DL control channel. The user apparatus 100 performs blind decoding by assuming that a plurality of DCIs are transmitted by the aggregated DL control channel. For example, in the case in which it is configured that two DCIs are received, when the user apparatus 100 detects one DCI, and the user apparatus 100 continues blind decoding for detecting another DCI. The number of the plurality of DCIs may be predetermined, or may be configured by configuration information transmitted from the base station 200 to the user apparatus 100. Also, each DCI includes different information. Also, when using RNTI for detection of the DCI, the RNTI may be the same or may be different among a plurality of DCIs. Also, for example, when two DCIs are transmitted, a first RNTI for first DCI and a second RNTI for the second DCI may be used.

Figure 18A:
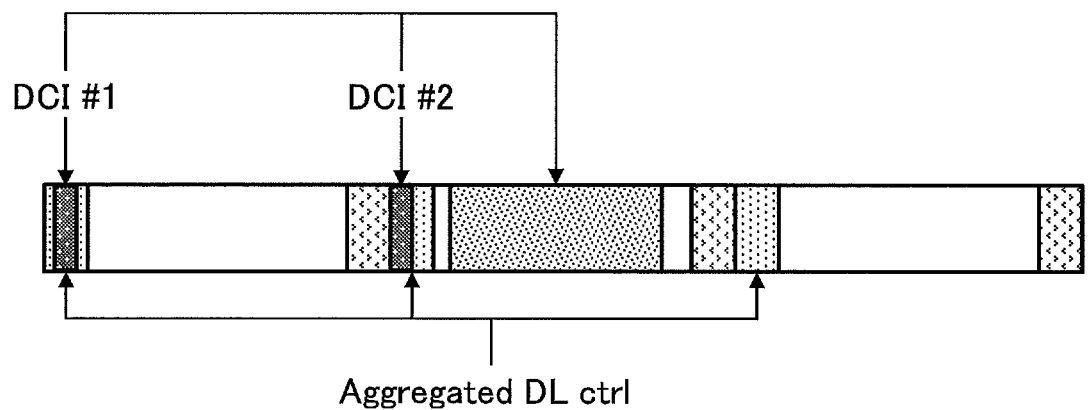
FIG. 18A is a diagram for explaining an example of a case for transmitting a plurality of DCIs.

FIG. 18A shows an example in which the base station 200 transmits two DCIs by one aggregated DL control channel. Also, in this example, a data resource is assigned right after DCI.

In the example of FIG. 18A, for example, DCI #1 includes a slot type (example: for UL data, for DL data, DL centric or UL centric of the slot allocated data channel), and a rank. Also, for example, DCI #2 includes MCS/New data indicator/RV, resource block assignment information, HARQ information and the like.

Figure 18B:
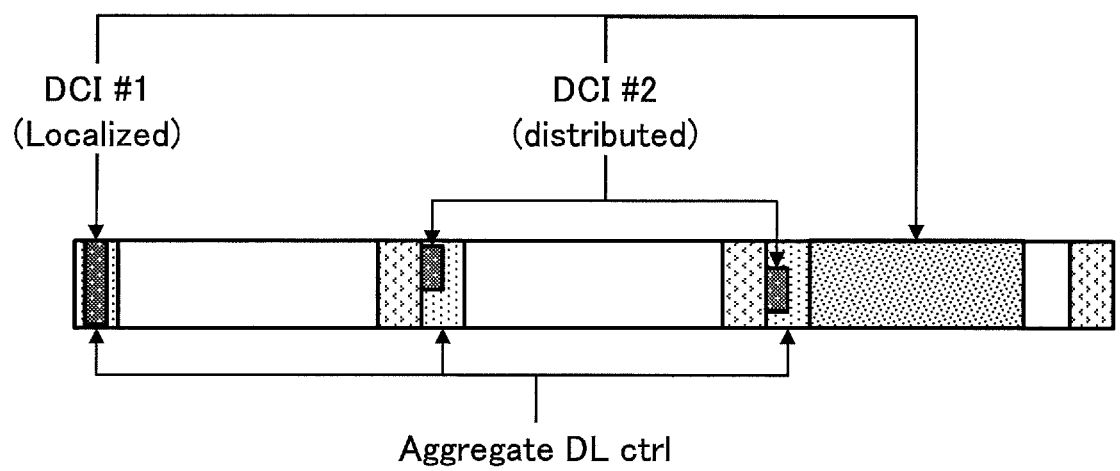
FIG. 18B is a diagram for explaining an example of a case for transmitting a plurality of DCIs.

Also, as shown in FIG. 18B, in the case in which the base station 200 transmits a plurality of DCIs to the user apparatus 100, the Localized DCI and the Distributed DCI may be combined.

Figure 19:
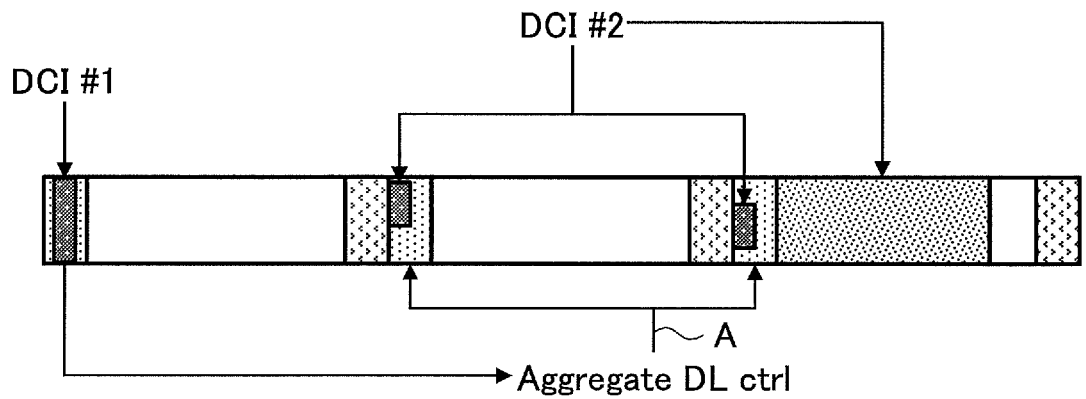
FIG. 19 is a diagram for explaining an example of a case for notifying of a resource of aggregated DL control channel by DCI.

Example in which DCI Notifies of the Resource of the Aggregated DL Control Channel As shown in FIG. 19, a DCI may specify the resource of the aggregated DL control channel after that. The DCI #1 shown in FIG. 19 includes resource information (Example: the number of slots including the DL control channel to be aggregated, start slot and the like) of the aggregated DL control channel after that indicated by A. The DCI #2 includes, for example, information for data decoding.

On DCI Format

In the present embodiment in which the aggregated DL control channel is used, for each DCI format of the DCI transmitted by the aggregated DL control channel, the number of slots for transmitting the DCI may be determined. The number of slots for transmitting the DCI for each DCI format may be preconfigured in the base station 200 and the user apparatus 100, or transmitted to the user apparatus 100 from the base station 200.

For example, a DCI of DCI format 0 is transmitted by the DL control channel of one slot, DCI of other DCI formats is transmitted by two slots of DL control channels. In this case, for example, when searching for the DCI of the DCI format 0, the user apparatus 100 searches the resource of the DL control channel of each slot constituting the aggregated DL control channel. Also, for example, when searching for the DCI in the DCI format other than the DCI format 0, the user apparatus 100 searches resources of the DL control channel for two slots.

As described above, since the number of slots in which the DCI is transmitted is determined according to the DCI format, the user apparatus 100 can efficiently search for the DCI, compared with the case where it is not so.

Apparatus Configuration

Functional configuration examples of the user apparatus 100 and the base station 200 that execute operation of the embodiment described above are described. The user apparatus 100 and the base station 200 have all the functions described in the present embodiment. However, the user apparatus 100 and the base station 200 may have a part of the functions described in the present embodiment.

<User Apparatus 100>

Figure 20:
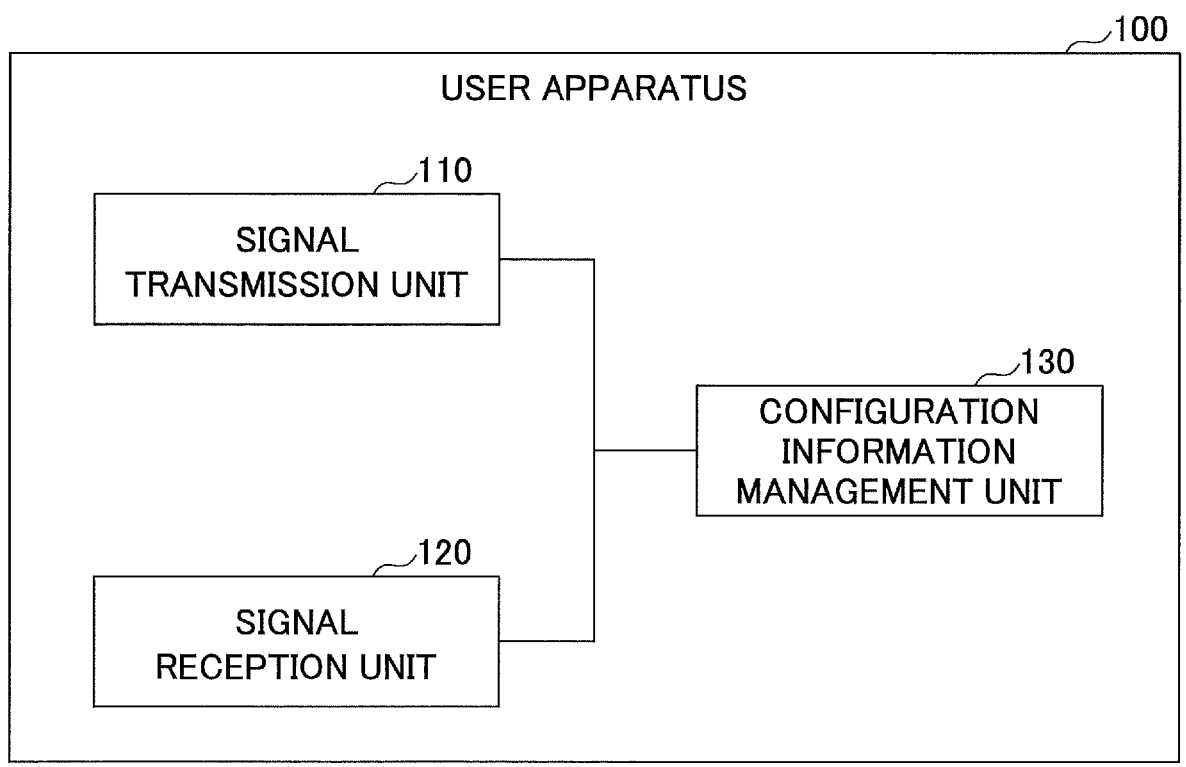
FIG. 20 is a diagram showing an example of a functional configuration of a user apparatus 100.

FIG. 20 is a diagram illustrating an example of a functional configuration of the user apparatus 100. As illustrated in FIG. 20, the user apparatus 100 includes a signal transmission unit 110, a signal reception unit 120, and a configuration information management unit 130. The functional configuration illustrated in FIG. 20 is only an example. Functional subdivision and names of the functional units are not particularly limited as long as the operations associated with the embodiment can be performed. The signal transmission unit 110 may be referred to as a transmitter, and the signal reception unit 120 may be referred to as a receiver.

The signal transmission unit 110 is configured to generate a lower-layer signal from the upper-layer information and transmit the signal by radio. The signal reception unit 120 is configured to receive various signals by radio and to acquire information of the upper layer from the received signals. Also, based on the configuration information in the configuration information management unit 130, the signal reception unit 120 receives the DCI by the aggregated DL control channel and receives the DL data based on the DCI. Also, the signal transmission unit 110 transmits UL data based on DCI.

The configuration information management unit 130 has a storage unit for storing preconfigured configuration information and configuration information configured from the base station 200 and the like in a dynamic and/or semi-static manner. For example, the configuration information management unit 130 stores configuration information received from the base station 200 in step S101 of FIG. 9.

For example, the configuration information management unit 130 is configured to store configuration information on an aggregated downlink control channel in which a plurality of downlink control channels in a plurality of slots are aggregated, the signal reception unit 120 is configured to receive downlink control information, from the base station, using the aggregated downlink control channel based on the configuration information.

The signal reception unit 120 may repeatedly receive the downlink control information by each downlink control channel in the plurality of slots, or receive partial information obtained by dividing the downlink control information by each downlink control channel in the plurality of slots.

<Base Station 200>

Figure 21:
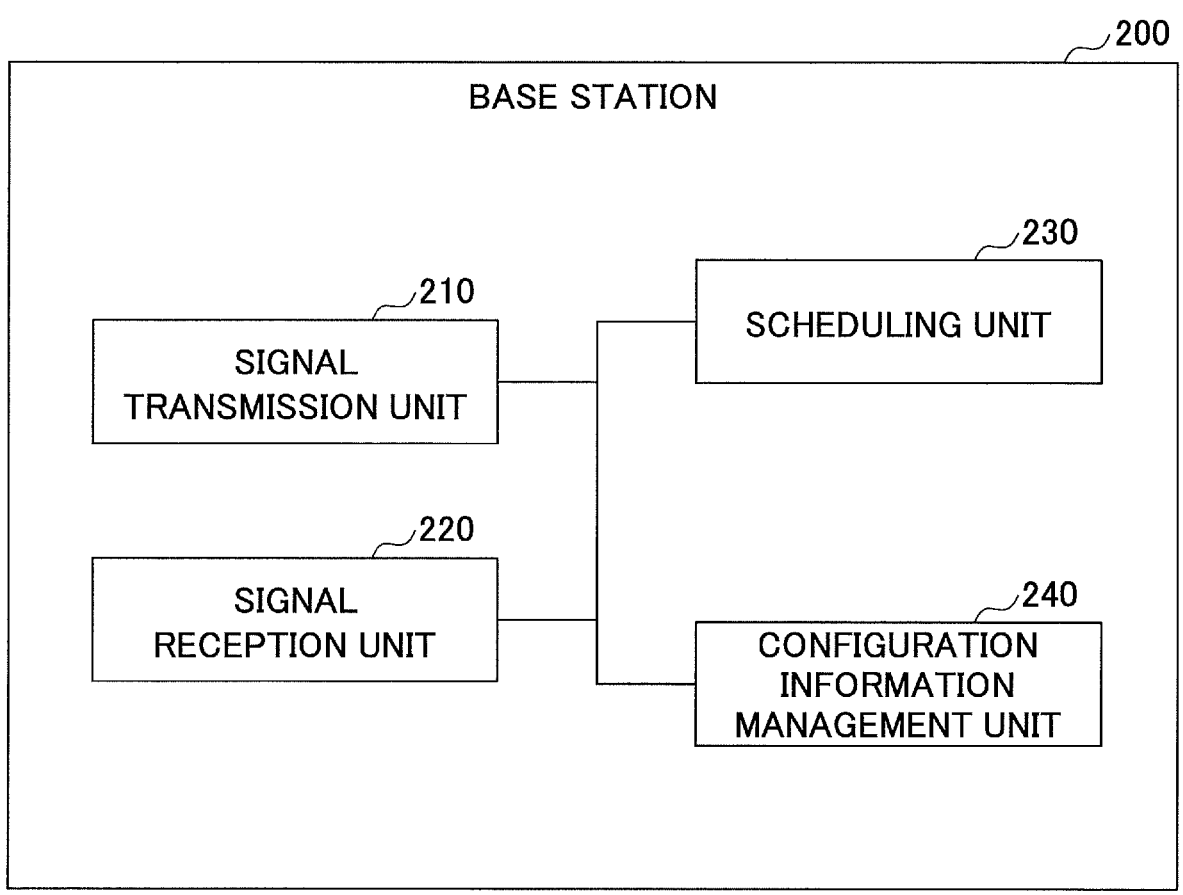
FIG. 21 is a diagram showing an example of a functional configuration of a base station 200.

FIG. 21 is a diagram illustrating an example of a functional configuration of the base station 200. As illustrated in FIG. 21, the base station 200 includes a signal transmission unit 210, a signal reception unit 220, a scheduling unit 230 and a configuration information management unit 240.

The functional configuration illustrated in FIG. 21 is only an example. Functional subdivision and names of the functional units are not particularly limited as long as the operations associated with the embodiment can be performed. The signal transmission unit 210 may be referred to as a transmitter, and the signal reception unit 220 may be referred to as a receiver.

The signal transmission unit 210 is configured to generate a lower-layer signal from the upper-layer information and transmit the signal by radio. The signal reception unit 220 is configured to receive various signals by radio and to acquire information of the upper layer from the received signals. Also, based on the configuration information in the configuration information management unit 240, the signal transmission unit 210 transmits the DCI through the aggregated DL control channel, and transmits DL data based on the contents of the transmitted DCI. Also, the signal reception unit 220 receives UL data based on content of the transmitted DCI.

The scheduling unit 230 performs resource allocation to the user apparatus 100, and the like. The configuration information management unit 240 has a storage unit for storing preconfigured configuration information, and the configuration information management unit 240 determines configuration information to be configured configure in the user apparatus 100 in a dynamic and/or semi-static manner, and holds it.

For example, the configuration information management unit 240 is configured to store configuration information on an aggregated downlink control channel in which a plurality of downlink control channels in a plurality of slots are aggregated; and the signal transmission unit 210 configured to transmit downlink control information, to the user apparatus, using the aggregated downlink control channel based on the configuration information.

The signal transmission unit 210 may repeatedly transmit the downlink control information using each downlink control channel in the plurality of slots, or transmit partial information obtained by dividing the downlink control information using each downlink control channel in the plurality of slots.

The signal transmission unit 210 may transmit the downlink control information by applying frequency hopping among the plurality of slots. The signal transmission unit 210 may also transmit, to the user apparatus, a plurality of pieces of downlink control information each including different information by using the aggregated downlink control channel.

<Hardware Configuration>

The block diagrams (FIGS. 20 and 21) which are used above to describe the embodiments illustrate blocks in the units of functions. The functional blocks (constituent units) are embodied in an arbitrary combination of hardware and/or software. Means for embodying the functional blocks is not particularly limited. That is, the functional blocks may be embodied by one unit in which a plurality of components are physically and/or logically coupled, or may be embodied by two or more devices which are physically and/or logically separated and which are connected directly and/or indirectly (for example, in a wired and/or wireless manner).

Figure 22:
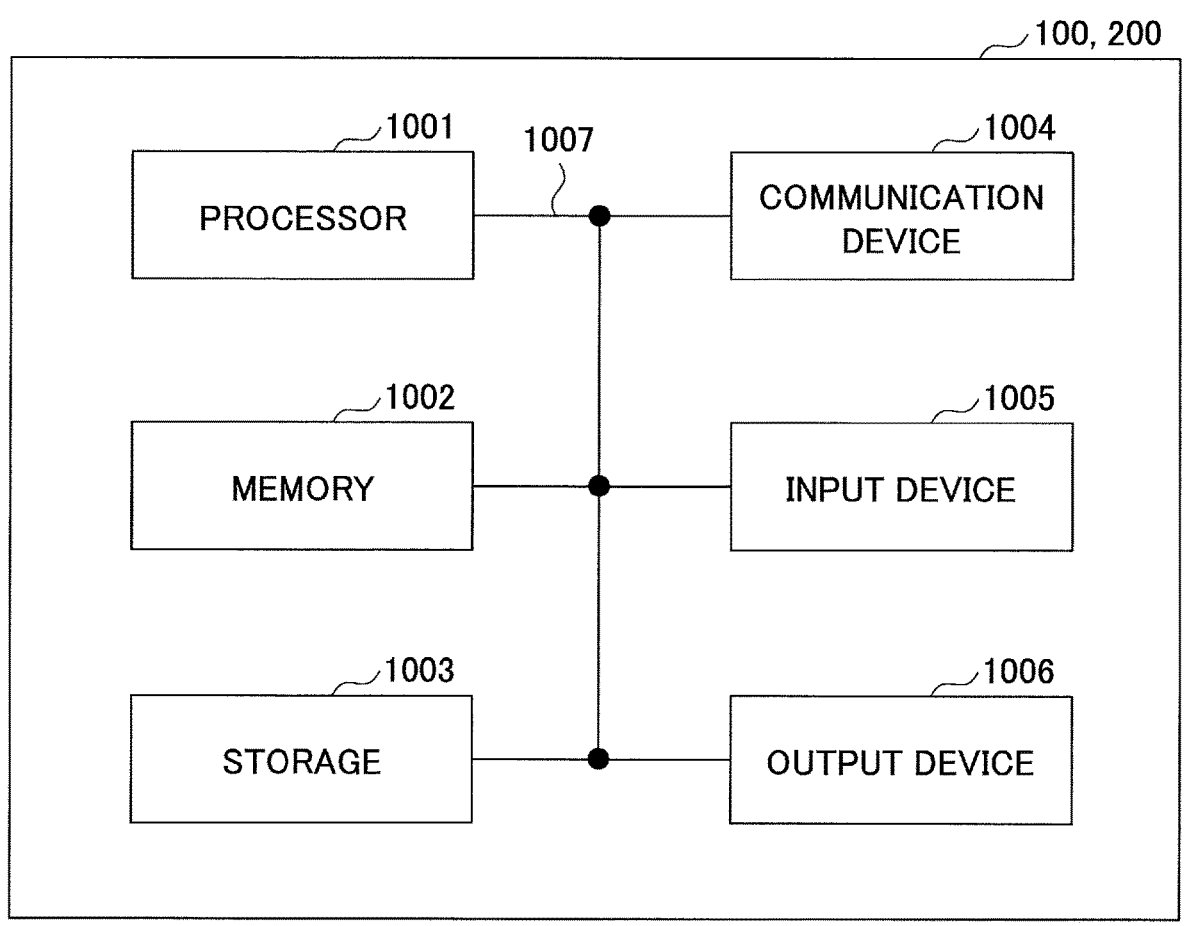
FIG. 22 is a diagram showing an example of a hardware configuration of the user apparatus 100 and the base station 200.

For example, the user apparatus 100 and the base station 200 according to this embodiment may function as computers that perform the processes according to this embodiment. FIG. 22 is a diagram illustrating an example of a hardware configuration of the user apparatus 100 and the base station 200 according to this embodiment. The user apparatus 100 and the base station 200 may be physically configured as a computer device including a processor 1001, a memory 1002, a storage 1003, a communication device 1004, an input device 1005, an output device 1006, and a bus 1007.

In the following description, a word "device" may be referred to as a circuit, a device, a unit, or the like. The hardware configurations of the user apparatus 100 and the base station 200 may include one or more devices indicated by reference numerals 1001 to 1006 in the drawing or may not include some devices thereof.

The functions of the user apparatus 100 and the base station 200 are realized by causing hardware such as the processor 1001 and the memory 1002 to read predetermined software (a program) and causing the processor 1001 to perform calculation and to control communication of the communication device 1004 and reading and/or writing of data in the memory 1002 and the storage 1003.

The processor 1001 controls the computer as a whole, for example, by activating an operating system. The processor 1001 may be constituted by a central processing device (CPU: central processing unit) including an interface with peripherals, a control device, a calculation device, a register, and the like.

The processor 1001 reads a program (program codes), a software module, or data from the storage 1003 and/or the communication deice 1004 to the memory 1002 and performs various processes in accordance therewith. As the program, a program causing a computer to perform at least a part of the operations described above in the embodiment is used. For example, the signal transmission unit 110, the signal reception unit 120, and the configuration information managing unit 130 of the user apparatus 100 shown in FIG. 20 may be embodied by a control program which is stored in the memory 1002 and operated by the processor 1001. The signal transmission unit 210, the signal reception unit 220, the scheduling unit 230 and the configuration information management unit 240 of the base station 200 shown in FIG. 21 may be embodied by a control program which is stored in the memory 1002 and operated by the processor 1001. Various processes described above have been described to be performed by a single processor 1001, but may be simultaneously or sequentially performed by two or more processors 1001. The processor 1001 may be mounted as one or more chips. The program may be transmitted from a network via an electric communication line.

The memory 1002 is a computer-readable recording medium and may be constituted, for example, by at least one of a read only memory (ROM), an erasable programmable ROM (EPROM), an electrically erasable programmable ROM (EEPROM), and a random access memory (RAM). The memory 1002 may be referred to as a register, a cache, or a main memory (a main storage device). The memory 1002 can store a program (program codes), a software module, or the like which can be executed to perform the processes according to the embodiment.

The storage 1003 is a computer-readable recording medium and may be constituted, for example, by at least one of an optical disc such as a compact disc ROM (CD-ROM), a hard disk drive, a flexible disk, a magneto-optical disk (such as a compact disk, a digital versatile disk, or a Blu-ray (registered trademark) disk), a smart card, a flash memory (such as a card, a stick, or a key drive), a floppy (registered trademark) disk, and a magnetic strip. The storage 1003 may be referred to as an auxiliary storage device. Examples of the recording medium may include a database including the memory 1002 and/or the storage 1003, a server, and another appropriate medium.

The communication device 1004 is hardware (a transceiver device) that allows communication between computers via a wired and/or wireless network and is referred to as, for example, a network device, a network controller, a network card, or a communication module. For example, the signal transmission unit 110 and the signal reception unit 120 of the user apparatus 100 may be embodied by the communication device 1004. The signal transmission unit 210 and the signal reception unit 220 of the base station 200 may be embodied by the communication device 1004.

The input device 1005 is an input device (such as a keyboard, a mouse, a microphone, a switch, a button, or a sensor) that receives an input from the outside. The output device 1006 is an output device (such as a display, a speaker, or an LED lamp) that performs outputting to the outside. The input device 1005 and the output device 1006 may be configured as a unified body (such as a touch panel).

The devices such as the processor 1001 and the memory 1002 are connected to each other via the bus 1007 for transmitting and receiving information. The bus 1007 may be constituted by a single bus or may be configured by different buses for the devices.

The user apparatus 100 and the base station 200 may be configured to include hardware such as a microprocessor, a digital signal processor (DSP), an application specific integrated circuit (ASIC), a programmable logic device (PLD), or a field programmable gate array (FPGA), or a part or all of the functional blocks may be embodied by the hardware. For example, the processor 1001 may be implemented by at least one hardware module of these.

Summary of Embodiments

As described above, according to the present embodiment, there is provided a base station configured to perform communication with a user apparatus in a radio communication system, including: a storage unit configured to store configuration information on an aggregated downlink control channel in which a plurality of downlink control channels in a plurality of slots are aggregated; and a transmission unit configured to transmit downlink control information, to the user apparatus, using the aggregated downlink control channel based on the configuration information.

According to the above-configuration, it becomes possible to enable a user apparatus to properly receive downlink control information in a radio communication system that supports a scheme for flexibly controlling resources for use in downlink communication and uplink communication for each cell.

The transmission unit may repeatedly transmit the downlink control information using each downlink control channel in the plurality of slots, or transmit partial information obtained by dividing the downlink control information using each downlink control channel in the plurality of slots.

By repeatedly transmitting downlink control information, for example, even a user apparatus with poor reception quality can properly receive the downlink control information. By transmitting the partial information obtained by dividing the downlink control information, for example, it is possible to appropriately transmit large downlink control information with a large amount of information.

The transmission unit transmits the downlink control information by applying frequency hopping among the plurality of slots. According to this configuration information, for example, even if the quality of a particular frequency resource is not good, the user apparatus can receive the downlink control information properly.

The transmission unit may transmit, to the user apparatus, a plurality of pieces of downlink control information each including different information by using the aggregated downlink control channel. According to this configuration, content of downlink control information with large information amount can be properly received.

Also, according to the present embodiment, there is provided a user apparatus configured to perform communication with a base station in a radio communication system, including: a storage unit configured to store configuration information on an aggregated downlink control channel in which a plurality of downlink control channels in a plurality of slots are aggregated; and a reception unit configured to receive downlink control information, from the base station, using the aggregated downlink control channel based on the configuration information.

According to the above-configuration, it becomes possible to enable a user apparatus to properly receive downlink control information in a radio communication system that supports a scheme for flexibly controlling resources for use in downlink communication and uplink communication for each cell.

The reception unit may repeatedly receive the downlink control information by each downlink control channel in the plurality of slots, or may receive partial information obtained by dividing the downlink control information by each downlink control channel in the plurality of slots.

By repeatedly receiving downlink control information, for example, even a user apparatus with poor reception quality can properly receive the downlink control information. By receiving the partial information obtained by dividing the downlink control information, for example, it is possible to appropriately receive large downlink control information with a large amount of information.

Complement of Embodiment

While embodiments of the invention have been described above, the invention disclosed herein is not limited to the embodiments and it will be understood by those skilled in the art that various modifications, corrections, alternatives, substitutions, and the like can be made. While description has been made using specific numerical value examples for the purpose of promoting understanding of the invention, such numerical values are only simple examples and arbitrary appropriate values may be used unless otherwise specified. The sorting of items in the above description is not essential to the invention, details described in two or more items may be combined for use if necessary, or details described in a certain item may be applied to details described in another item (unless incompatible). Boundaries between functional units or processing units in the functional block diagrams cannot be said to be necessarily correspond to boundaries of physical components. Operations of a plurality of functional units may be physically performed by one component, or an operation of one functional unit may be physically performed by a plurality of components. The processing sequences described above may be changed in the order as long as they are not incompatible with each other. For the purpose of convenience of description, while a user apparatus 100 and a base station 200 have been described above with reference to functional block diagrams, such apparatuses may be embodied by hardware, by software, or by combination thereof. Each of software which is executed by a processor of the user apparatus 100 and software which is executed by a processor of the base station 200 in the embodiments of the invention may be stored in an appropriate storage medium such as a random access memory (RAM), a flash memory, a read only memory (ROM), an EPROM, an EEPROM, a register, a hard disk (HDD), a removable disk, a CD-ROM, a database, or a server.

Notification of information is not limited to the aspects/embodiments described in this specification, but may be performed using other methods. For example, the notification of information may be performed physical layer signaling (such as downlink control information (DCI) or uplink control information (UCI)), upper layer signaling (such as radio resource control (RRC) signal, medium access control (MAC) signaling, or broadcast information (master information block (MIB) and system information block (SIB))), other signals, or combinations thereof. The RRC signaling may be referred to as an RRC message and may be, for example, an RRC connection setup message or an RRC connection reconfiguration message.

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which the systems are extended.

The processing sequences, the sequences, flowcharts and the like of the aspects/embodiments described above in this specification may be changed in the order as long as they are not incompatible with each other. For example, in the methods described in this specification, various steps as elements are described in an exemplary order and the methods are not limited to the described order.

Specific operations which are performed by the base station 200 in this specification may be performed by an upper node thereof in some cases. In a network including one or more network nodes including a base station 200, various operations which are performed to communicate with a user apparatus 100 can be apparently performed by the base station 200 and/or network nodes (for example, an MME or an S-GW can be considered but the network nodes are not limited thereto) other than the base station 200. A case in which the number of network nodes other than the base station 200 is one has been described above, but a combination of plural different network nodes (for example, an MME and an S-GW) may be used.

The aspects/embodiments described in this specification may be used alone, may be used in combination, or may be switched with implementation thereof.

The user apparatus 100 may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The base station 200 may be referred to as an NodeB (NB), an enhanced NodeB (eNB), a base station, or some other appropriate terms by those skilled in the art.

The terms "determining (determining)" and "deciding (determining)" used in this specification may include various types of operations. For example, "determining" and "deciding" may include deeming that to perform judging, calculating, computing, processing, deriving, investigating, looking up (e.g., search in a table, a database, or another data structure), or ascertaining is to perform "determining" or "deciding". Furthermore, "determining" and "deciding" may include deeming that to perform receiving (e.g., reception of information), transmitting (e.g., transmission of information), input, output, or accessing (e.g., accessing data in memory) is to perform "determining" or "deciding". Furthermore, "determining" and "deciding" may include deeming that to perform resolving, selecting, choosing, establishing, or comparing is to perform "determining" or "deciding". Namely, "determining" and "deciding" may include deeming that some operation is to perform "determining" or "deciding".

An expression "on the basis of ~" which is used in this specification does not refer to only "on the basis of only ~," unless apparently described. In other words, the expression "on the basis of ~" refers to both "on the basis of only ~" and "on the basis of at least ~."

So long as terms "include" and "including" and modifications thereof are used in this specification or the appended claims, the terms are intended to have a comprehensive meaning similar to a term "comprising." A term "or" which is used in this specification or the claims is intended not to mean an exclusive or.

In the entire disclosure, for example, when an article such as a, an, or the is added in translation into English, such an article refers to including the plural unless otherwise recognized from the context.

While the invention has been described above in detail, it is apparent to those skilled in the art that the invention is not limited to the embodiments described in the specification. The invention can be carried out as modified and changed embodiments without departing from the concept and scope of the invention which are defined by the appended claims. Accordingly, the description in this specification is made for illustrative description and does not have any restrictive meaning.

This patent application is based upon and claims the benefit of priority of Japanese Patent Application No. 2017-019137 filed on Feb. 3, 2017, and the entire contents of Japanese Patent Application No. 2017-019137 are incorporated herein by reference.

DESCRIPTION OF REFERENCE SIGNS 100 user apparatus
110 signal transmission unit
120 signal reception unit
130 configuration information management unit
200 base station
210 signal transmission unit
220 signal reception unit
230 scheduling unit
240 configuration information management unit
1001 processor
1002 memory
1003 storage
1004 communication device
1005 input device
1006 output device

The invention claimed is:

1. A base station configured to perform communication with a terminal in a radio communication system, comprising:
a storage configured to store configuration information on an aggregated downlink control channel in which a plurality of downlink control channels in a plurality of slots are aggregated; and
a transmitter configured to transmit downlink control information, to the terminal, using the aggregated downlink control channel based on the configuration information,
wherein the configuration information comprises a number of orthogonal frequency-division multiplexed (OFDM) symbols for designating a resource amount of the aggregated downlink control channel.

2. The base station as claimed in claim 1, wherein the transmitter repeatedly transmits the downlink control information using each downlink control channel in the plurality of slots, or transmits partial information obtained by dividing the downlink control information using each downlink control channel in the plurality of slots.

3. The base station as claimed in claim 1, wherein the transmitter transmits the downlink control information by applying frequency hopping among the plurality of slots.

4. The base station as claimed in claim 1, wherein the transmitter transmits, to the terminal, a plurality of pieces of downlink control information each including different information by using the aggregated downlink control channel.

5. The base station as claimed in claim 2, wherein the transmitter transmits the downlink control information by applying frequency hopping among the plurality of slots.

6. The base station as claimed in claim 2, wherein the transmitter transmits, to the terminal, a plurality of pieces of downlink control information each including different information by using the aggregated downlink control channel.

7. The base station as claimed in claim 3, wherein the transmitter transmits, to the terminal, a plurality of pieces of downlink control information each including different information by using the aggregated downlink control channel.

8. A terminal configured to perform communication with a base station in a radio communication system, comprising:
a storage configured to store configuration information on an aggregated downlink control channel in which a plurality of downlink control channels in a plurality of slots are aggregated; and
a receiver configured to receive downlink control information, from the base station, using the aggregated downlink control channel based on the configuration information,
wherein the configuration information comprises a number of orthogonal frequency-division multiplexed (OFDM) symbols for designating a resource amount of the aggregated downlink control channel.

9. The terminal as claimed in claim 8, wherein the receiver repeatedly receives the downlink control information by each downlink control channel in the plurality of slots, or receives partial information obtained by dividing the downlink control information by each downlink control channel in the plurality of slots.

* * * * *